(12) United States Patent
Buddhiraju et al.

(10) Patent No.: US 12,468,758 B1
(45) Date of Patent: Nov. 11, 2025

(54) ATTRIBUTE RECHARACTERIZATION IN INDIVIDUAL PORTIONS OF IMAGES

(71) Applicant: Bank of America Corporation, Charlotte, NC (US)

(72) Inventors: Nagaraju Buddhiraju, Concord, NC (US); Ramakrishna Akula, Darsi (IN); Arjun I T, Malappuram (IN); Balachander Kamatchi, Chennai (IN); Vijay Kumar Yarabolu, Hyderabad (IN); Savleen Kaur, Faridabad (IN); Manikandan Rajaraman, Chennai (IN); Lakshmi Narasimha Prasad Dornala, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/964,192

(22) Filed: Nov. 29, 2024

(51) Int. Cl.
    *G06F 16/00* (2019.01)
    *G06F 16/55* (2019.01)

(52) U.S. Cl.
    CPC .................. *G06F 16/55* (2019.01)

(58) Field of Classification Search
    CPC .................................................. G06F 16/55
    See application file for complete search history.

(56) References Cited

U.S. PATENT DOCUMENTS

| | | |
|---|---|---|
| 7,823,055 B2 | 10/2010 | Sull et al. |
| 8,005,935 B2 | 8/2011 | Pradhan et al. |
| 8,171,032 B2 | 5/2012 | Herz |
| 8,370,362 B2 | 2/2013 | Szabo |
| 10,401,732 B2 | 9/2019 | Hsu et al. |
| 10,452,923 B2 | 10/2019 | Block |
| 10,911,468 B2 | 2/2021 | Muddu et al. |
| 11,181,893 B2 | 11/2021 | Cella et al. |
| 11,232,558 B2 | 1/2022 | Liu et al. |
| 11,482,320 B2 | 10/2022 | Klaiman |
| 11,631,029 B2 | 4/2023 | Puri et al. |

(Continued)

OTHER PUBLICATIONS

Americans with Disabilities Act, https://www.dol.gov/general/topic/disability/ada, Printed: Nov. 19, 2024, pp. 1-2.

(Continued)

*Primary Examiner* — Ajith Jacob

(57) ABSTRACT

An apparatus comprises a memory communicatively coupled to a processor. The processor is configured to generate a tag for a portion of peripheral information, determine a correlation between the peripheral information and the tag and execute a machine learning algorithm in response to determining that an amount of information preserved is outside an accuracy tolerance to determine at least one difference between the peripheral information and the communication information, evaluate the at least one difference against historical data associated with the network device, determine multiple tagging commands based on an evaluation of the at least one difference against the historical data and modify the tag to incorporate the possible modifications, and generate a portion of the communication information based on the portion of the peripheral information in accordance with a modified version of the tag and transmit the portion of the communication information to the network device.

20 Claims, 11 Drawing Sheets

(56) References Cited

U.S. PATENT DOCUMENTS

| | | |
|---|---|---|
| 11,714,831 B2 | 8/2023 | Makhija et al. |
| 11,948,314 B2 | 4/2024 | Liao et al. |
| 11,954,112 B2 | 4/2024 | Siebel et al. |
| 2007/0041317 A1 | 2/2007 | Haley et al. |
| 2021/0192385 A1* | 6/2021 | Farré Guiu ............ G06V 20/41 |
| 2022/0019855 A1 | 1/2022 | Chen et al. |
| 2022/0293285 A1 | 9/2022 | Lamb et al. |

OTHER PUBLICATIONS

Sarah Berry, What is ADA Compliance? (And What Does ADA Compliance Mean for Your Website?), Article, Mar. 31, 2023, pp. 1-20.

What is a GAN?, https://aws.amazon.com/what-is/gan/, Printed: Nov. 19, 2024, pp. 1-9.

Chau Pham, Graph Convolutional Networks (GCN), Article, Oct. 22, 2020, pp. 1-16.

Matthew N. Bernstein, Graph Convolutional Neural Networks, Article, Sep. 24, 2023, pp. 1-22.

Nagaraju Buddhiraju, Machine learning training sample generation using generative adversarial networks, U.S. Appl. No. 18/964,163, filed Nov. 29, 2024, pp. 1-86.

Nagaraju Buddhiraju, Node generation in network graphs based on characterization attributes in portions of images, U.S. Appl. No. 18/964,175, filed Nov. 29, 2024, pp. 1-89.

Nagaraju Buddhiraju, On-demand node annotation in network graphs, U.S. Appl. No. 18/964,208, filed Nov. 29, 2024, pp. 1-82.

Nagaraju Buddhiraju, Query analysis using machine learning-driven APIs, U.S. Appl. No. 18/964,222, filed Nov. 29, 2024, pp. 1-80.

* cited by examiner

ATTRIBUTE RECHARACTERIZATION IN INDIVIDUAL PORTIONS OF IMAGES

TECHNICAL FIELD

The present disclosure relates generally to operations associated with attribute recharacterization in images, and more specifically to a system and method to recharacterize attributes in individual portions of images.

BACKGROUND

American with Disabilities Act (ADA) is a law for differently abled people that aims to eliminate discrimination by ensuring that people with disabilities have equal opportunities and access in all facets of public life like employment, education, and transportation among others. In certain situations, people with disabilities may request for documents to be read out loud by one or more services in a communication device. However, these services may not always read all the content in the documents if the documents have multiple stylistic formats. Further, these services may not accurately read all the content in the documents if the documents have multiple attribute layers. As documents become more complex, the services find it more difficult to properly read out loud accurate representations of the documents. In some cases, incomplete and/or wrong readouts may lead to users unable to understand and/or comprehend information shared in the documents. If a user is not able to understand a document, the user may disregard the document as irrelevant.

SUMMARY OF THE DISCLOSURE

In one or more embodiments, a system and method described herein are configured to use one or more machine learning (ML) algorithms to recharacterize attributes (e.g., format) in individual portions (e.g., pixels and/or groups of pixels) of an image. In particular, the system may be configured to evaluate and/or generate American with Disabilities Act (ADA) content in real time. In particular, the system may be configured to execute an ML algorithm to determine whether ADA responses (e.g., basis for ADA content such as reference sounds, voices, and the like) are accurate within one or more usage patterns associated with a user. Once the system determines that the ADA responses are accurate within a threshold, the system may generate ADA content for the user based on the ADA response. Here, the system may be configured to read inputs from a one or more peripherals used by the user, assign relevance of readable elements in the peripherals, and determine one or more readable elements in the inputs that the user is expected to understand. In this context, the system is configured to determine whether a user wants ADA content associated with the one or more readable elements. The system may determine whether ADA content can be generated from the readable elements prioritized by the user. If ADA content cannot be generated from the readable elements, the system may be configured to use the ML algorithm to separate and organize the readable elements until ADA content can be generated.

In one or more embodiments, the systems and methods described herein are integrated into a practical application of using ML models to reliable generate ADA compliant content and/or information. The systems may be configured to execute an ML algorithm to generatively attempt to generate ADA compliant content from one or more images. The one or more images may be scanned (e.g., parsed) to determine one or more portions (e.g., pixels and/or groups of pixels) in the images, determine information and/or content in the multiple portions, and generate ADA content based on the determined information. Herein, the system is configured to evaluate whether the ADA content is representative of information in the one or more images by comparing and contrasting the ADA content generated against multiple examples of successfully generated pieces of ADA content associated with one or more additional images. The ML models may be trained by the ML algorithm using one or more GANs to discern between accurately generated ADA content and generated information that does not meet an ADA content accuracy.

In one or more embodiments, the system and method are directed to improvements in computer systems. Specifically, the system reduces processor and memory usage in user devices and/or network devices performing operations in accordance with the trained ML models configured to generate ADA compliant content and/or information. In particular, the system trains the ML models to streamline generation of ADA compliant content in large quantities. As the trained ML models become proficient in generating ADA compliant content, the system uses less processing resources to identify information in documents that may be used as a basis for ADA content. Herein, the system may be configured to determine whether specific portions of a document are more relevant than others at the moment of determining possible image content to read as ADA content. For example, the trained ML models may enable the ML algorithm to streamline generating and reading descriptions of logos and/or stylistic aspects of a document before generating and/or reading more granular details such as signature lines and/or action items in the documents. Further, the system reduces memory usage because fewer iterations of ADA content may be needed to obtain ADA compliant content that successfully reads out loud every aspect of a document comprising information in an image format. For example, instead of iteratively generating ADA content and requesting user feedback until successful ADA content is generated, the system is configured to generate and read a single piece of ADA content to the user.

In one or more embodiments, the systems and the methods may be performed by an apparatus, such as the server. Further, the system may be a data exchange system, which comprises the apparatus. In addition, the system and the method may be performed as part of a process performed by the apparatus. As a non-limiting example, the apparatus may comprise a memory and a processor communicatively coupled to one another. The memory may be operable to store a machine learning algorithm configured to evaluate data in accordance with one or more machine learning models. The processor may be configured to receive peripheral information from a network device and generate a tag for a portion of the peripheral information. The peripheral information may comprise a first format. The tag may comprise guidance to generate communication information that correlates to the peripheral information. The communication information may comprise a second format. Further, the processor may be configured to determine a correlation between the peripheral information and the tag. The correlation may reference an amount of information preserved in the communication information that matches the peripheral information after the communication information is generated based on the peripheral information. The processor may be configured to determine whether the amount of information preserved is outside an accuracy tolerance and execute the machine learning algorithm in response to determining that the amount of information preserved is outside the accuracy tolerance to determine at least one difference between the peripheral information and the communication information and evaluate the at least one difference against historical data associated with the network device. The historical data may comprise patterns associated with one or more previous communication information generated from previous peripheral information received from the network device. The processor May be configured to determine multiple tagging commands based on an evaluation of the at least one difference against the historical data and modify the tag to incorporate the possible modifications. The tagging commands may comprise multiple modifications to the tag. The processor may be configured to generate a portion of the communication information based on the portion of the peripheral information in accordance with a modified version of the tag and transmit the portion of the communication information to the network device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
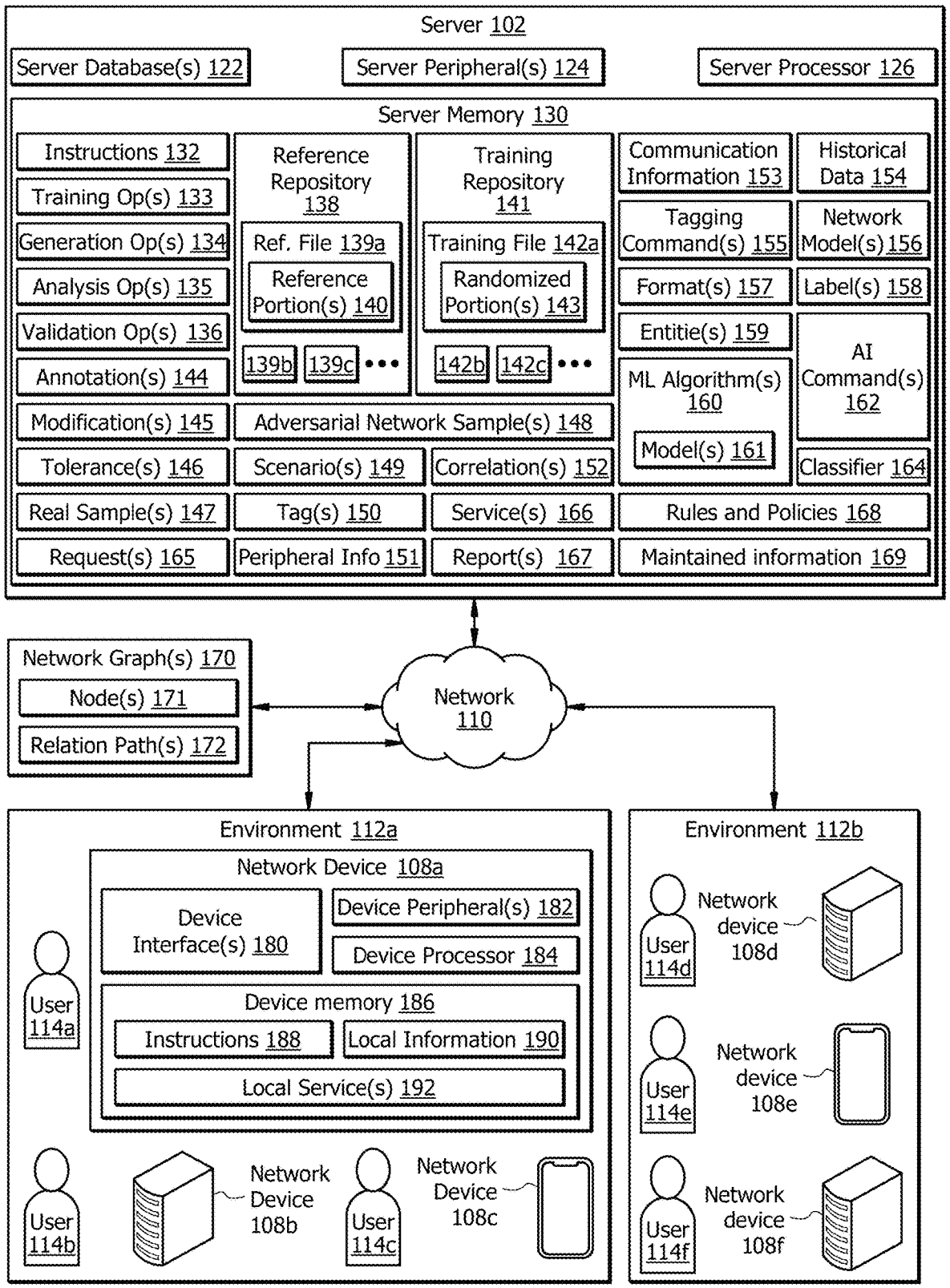
FIG. 1 illustrates a system in accordance with one or more embodiments.
Figure 2:
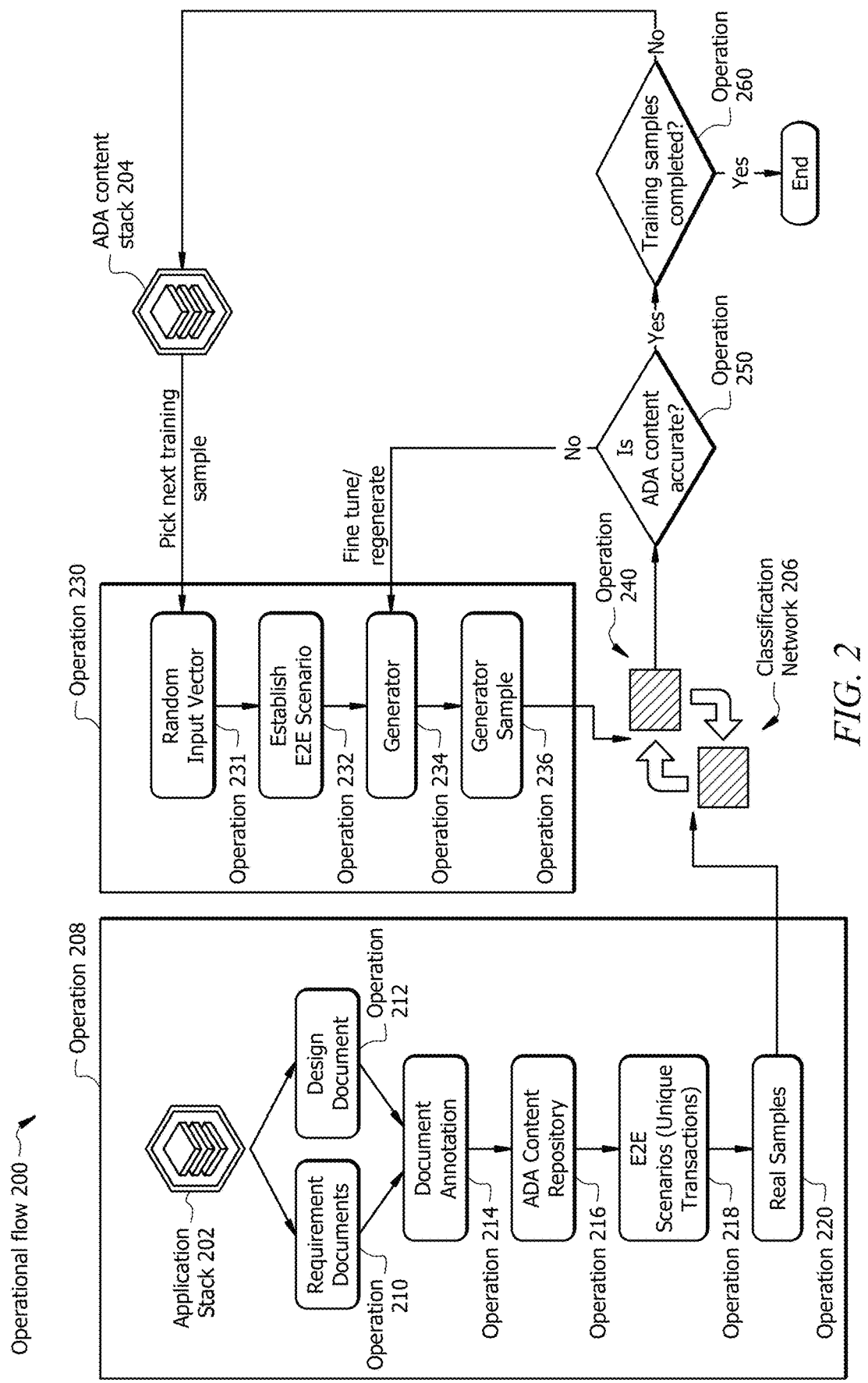
FIG. 2 illustrates one or more training operations performed by the system of FIG. 1 in accordance with one or more embodiments.
Figure 3:
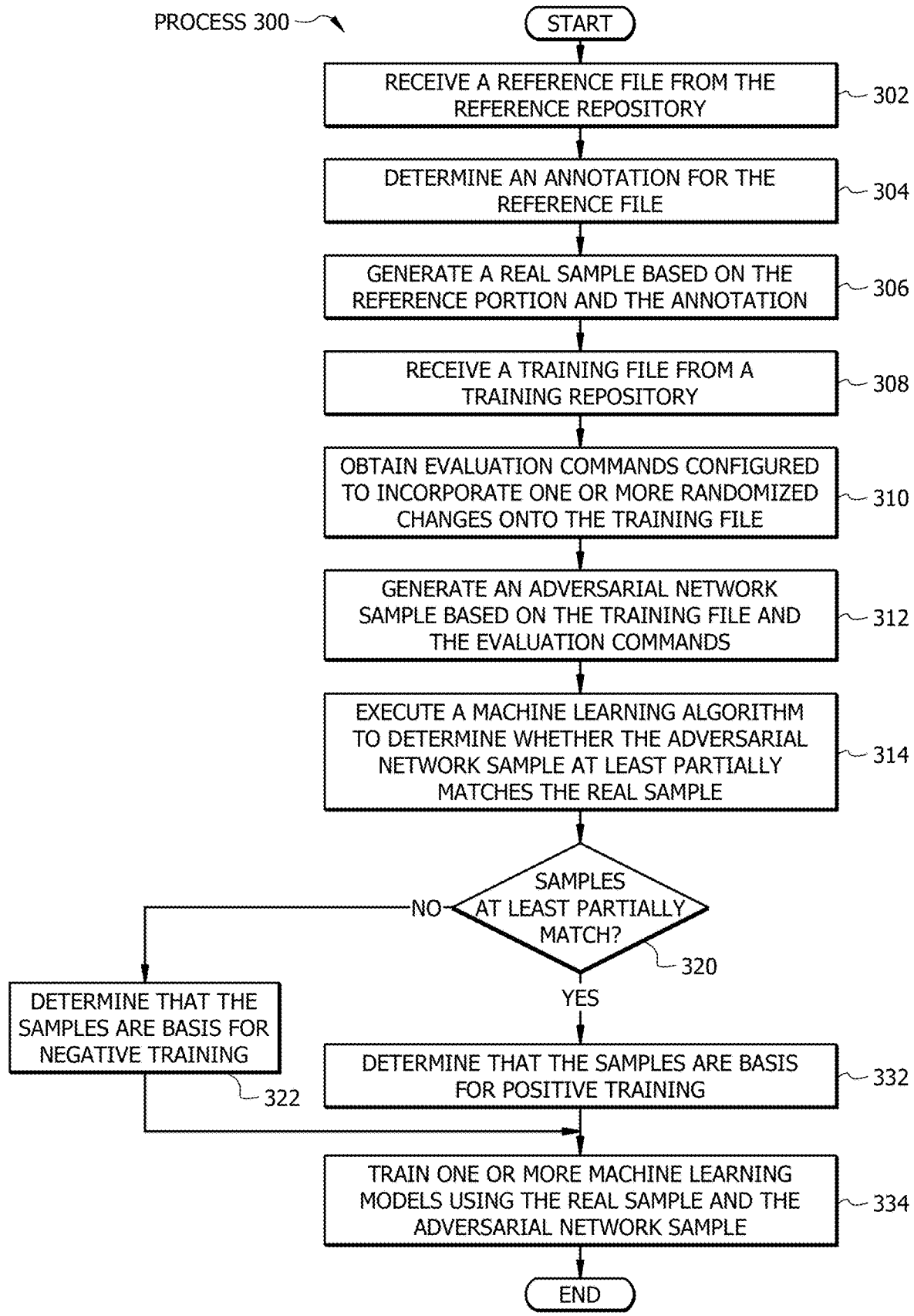
FIG. 3 illustrates an example flowchart of a method comprising the training operations of FIG. 2 in accordance with one or more embodiments.
Figure 4:
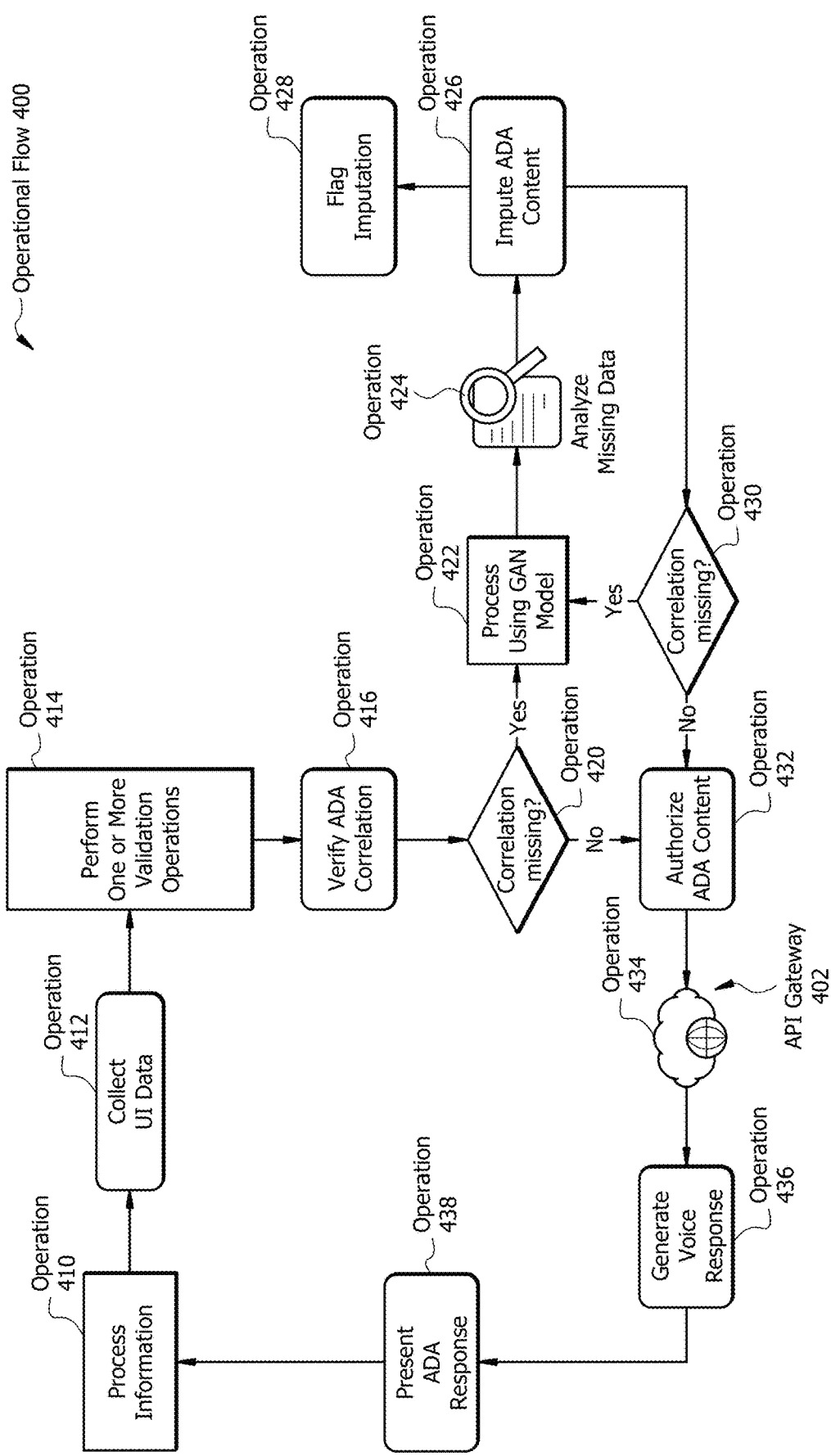
FIG. 4 illustrates one or more generation operations performed by the system of FIG. 1 in accordance with one or more embodiments.
Figure 5:
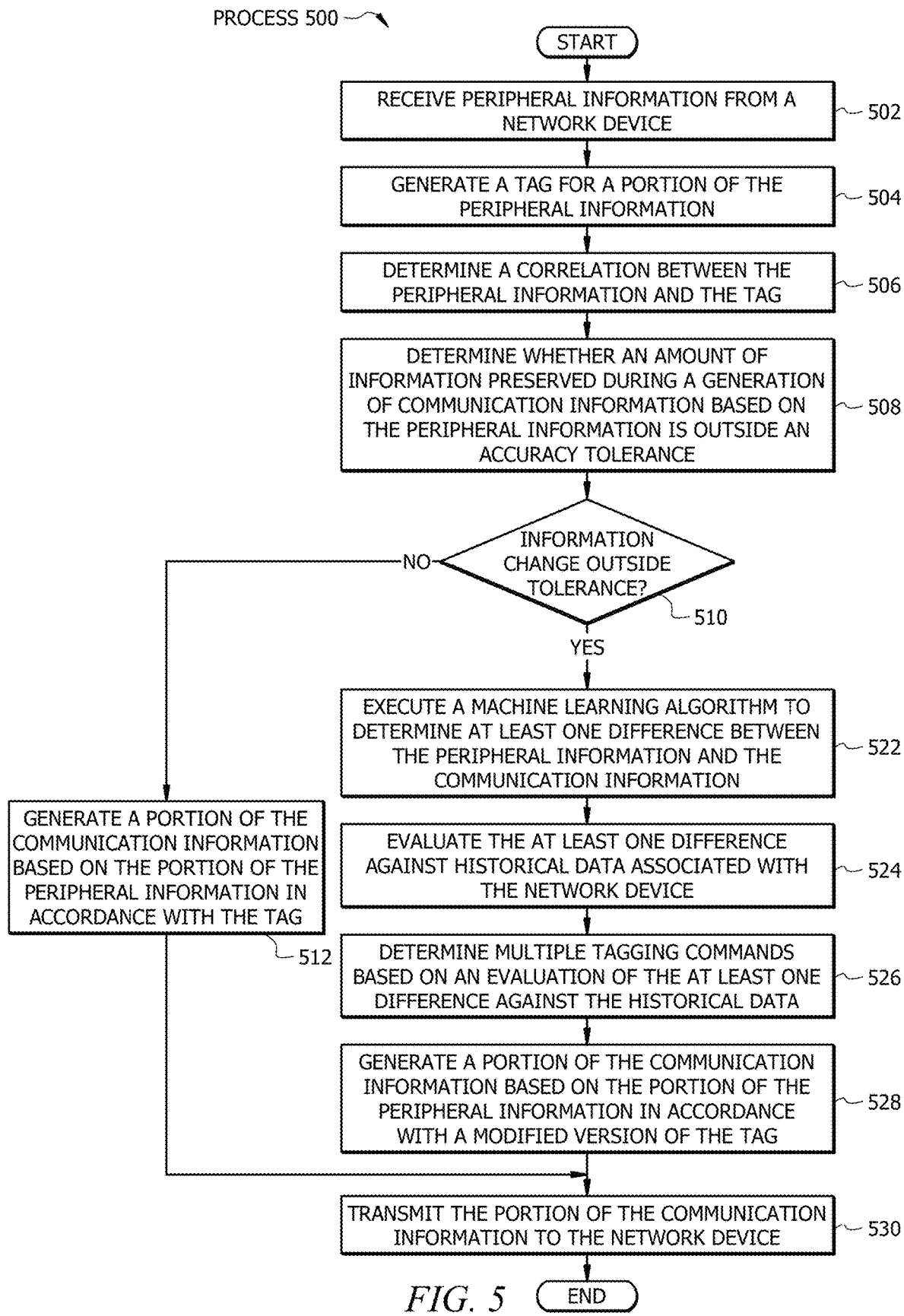
FIG. 5 illustrates an example flowchart of a method comprising the generation operations of FIG. 4 in accordance with one or more embodiments.
Figure 6:
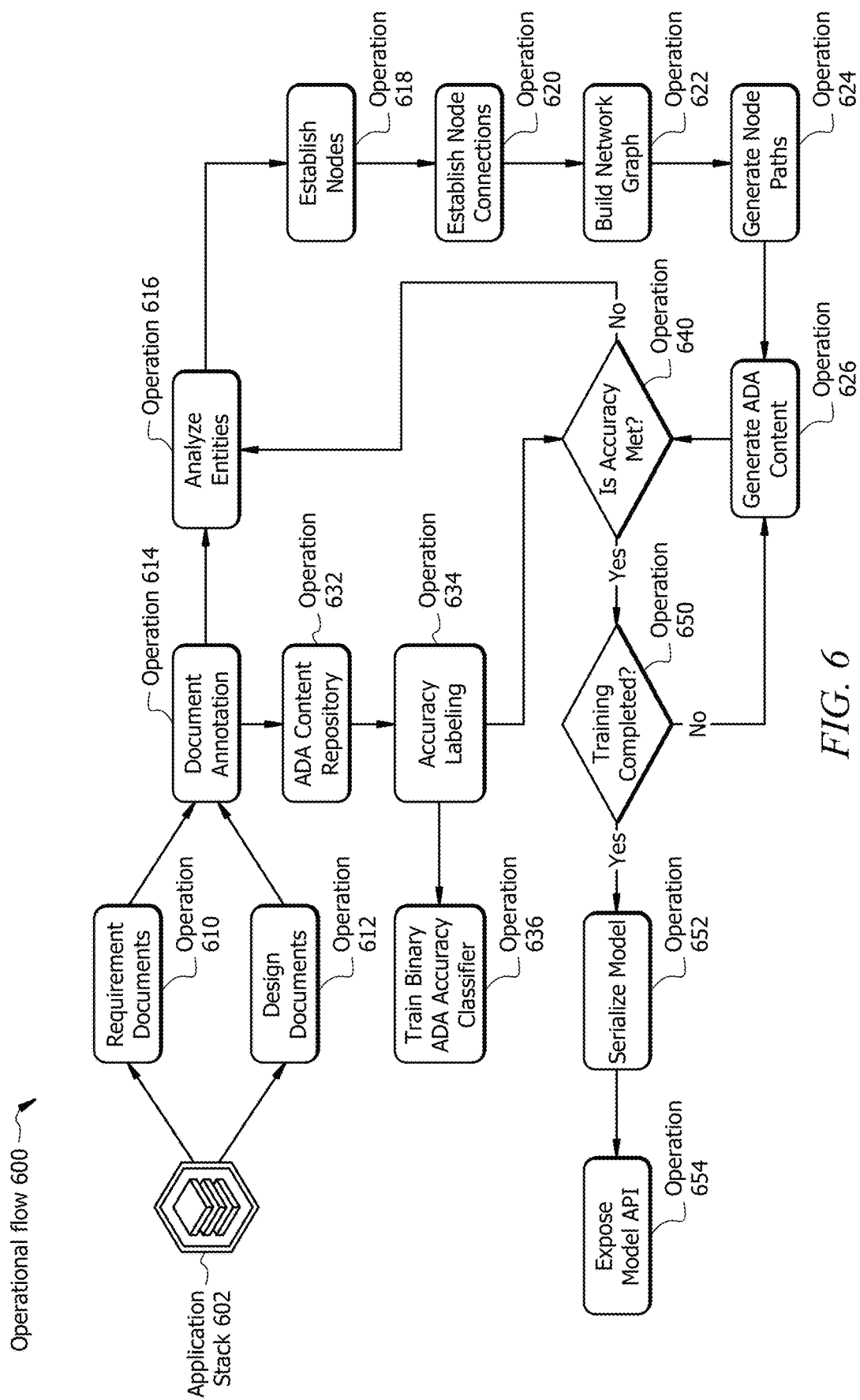
FIG. 6 illustrates one or more analysis operations performed by the system of FIG. 1 in accordance with one or more embodiments.
Figure 7:
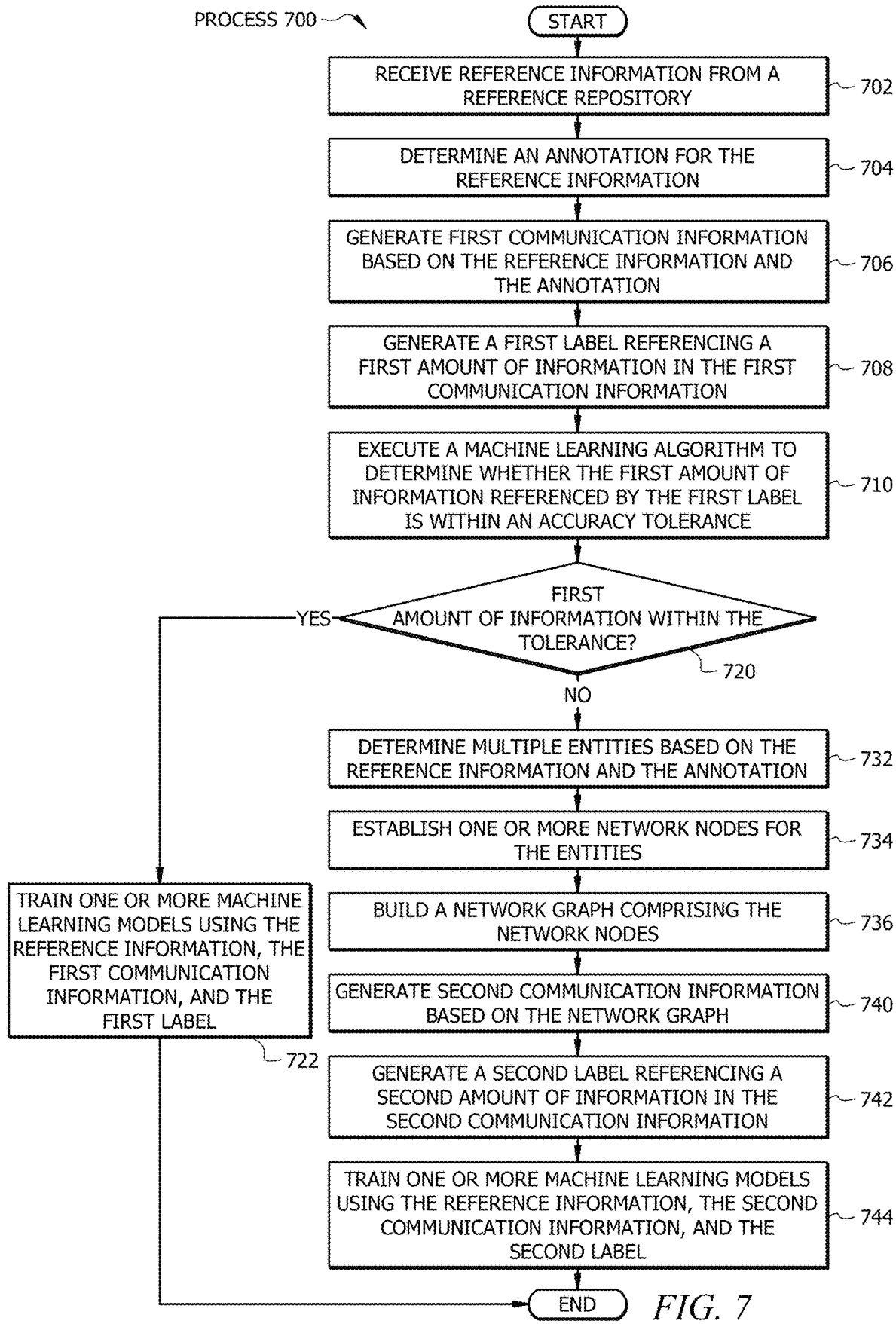
FIG. 7 illustrates an example flowchart of a method comprising the analysis operations of FIG. 6 in accordance with one or more embodiments.
Figure 8:
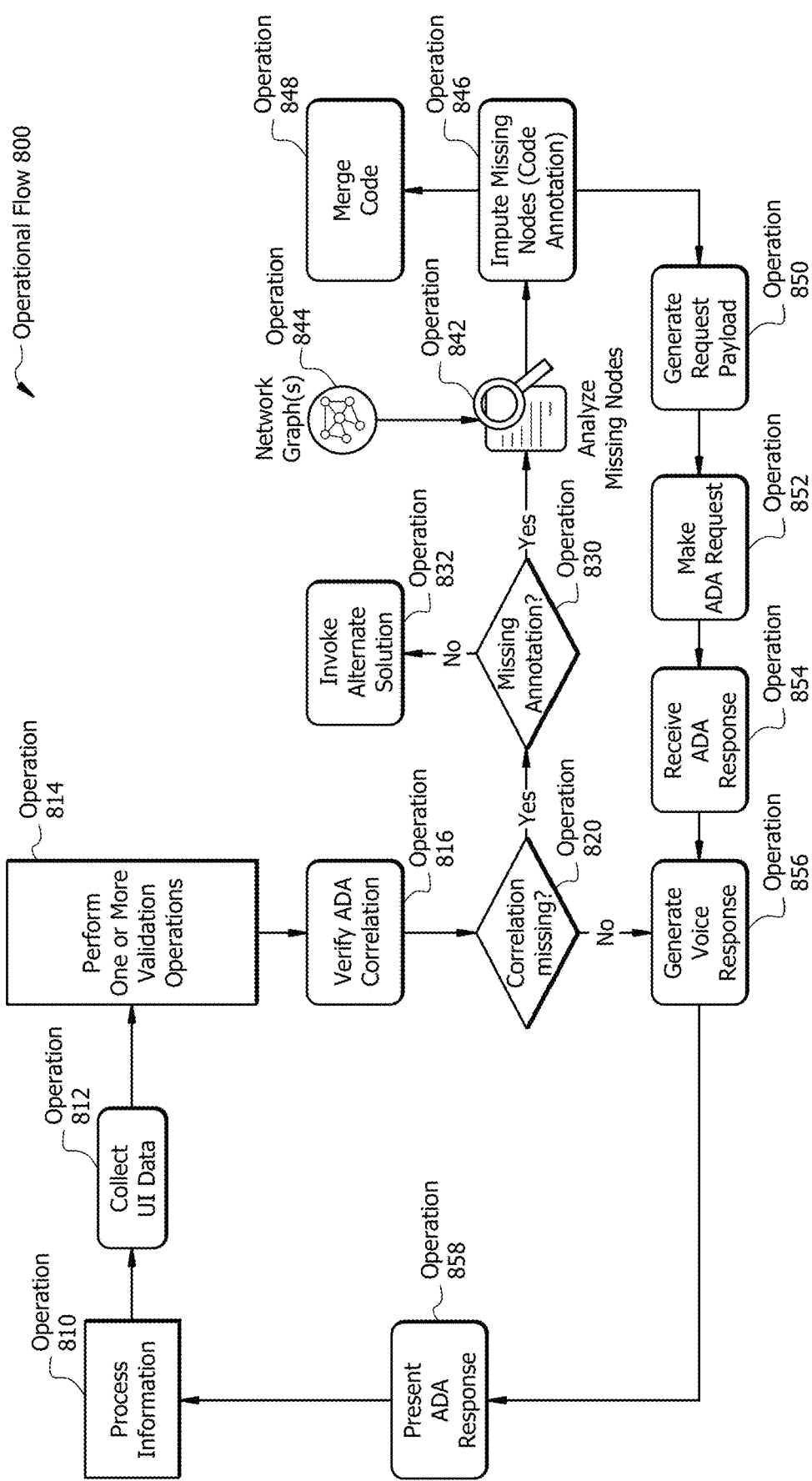
FIG. 8 illustrates one or more generation operations performed by the system of FIG. 1 in accordance with one or more embodiments.
Figure 9:
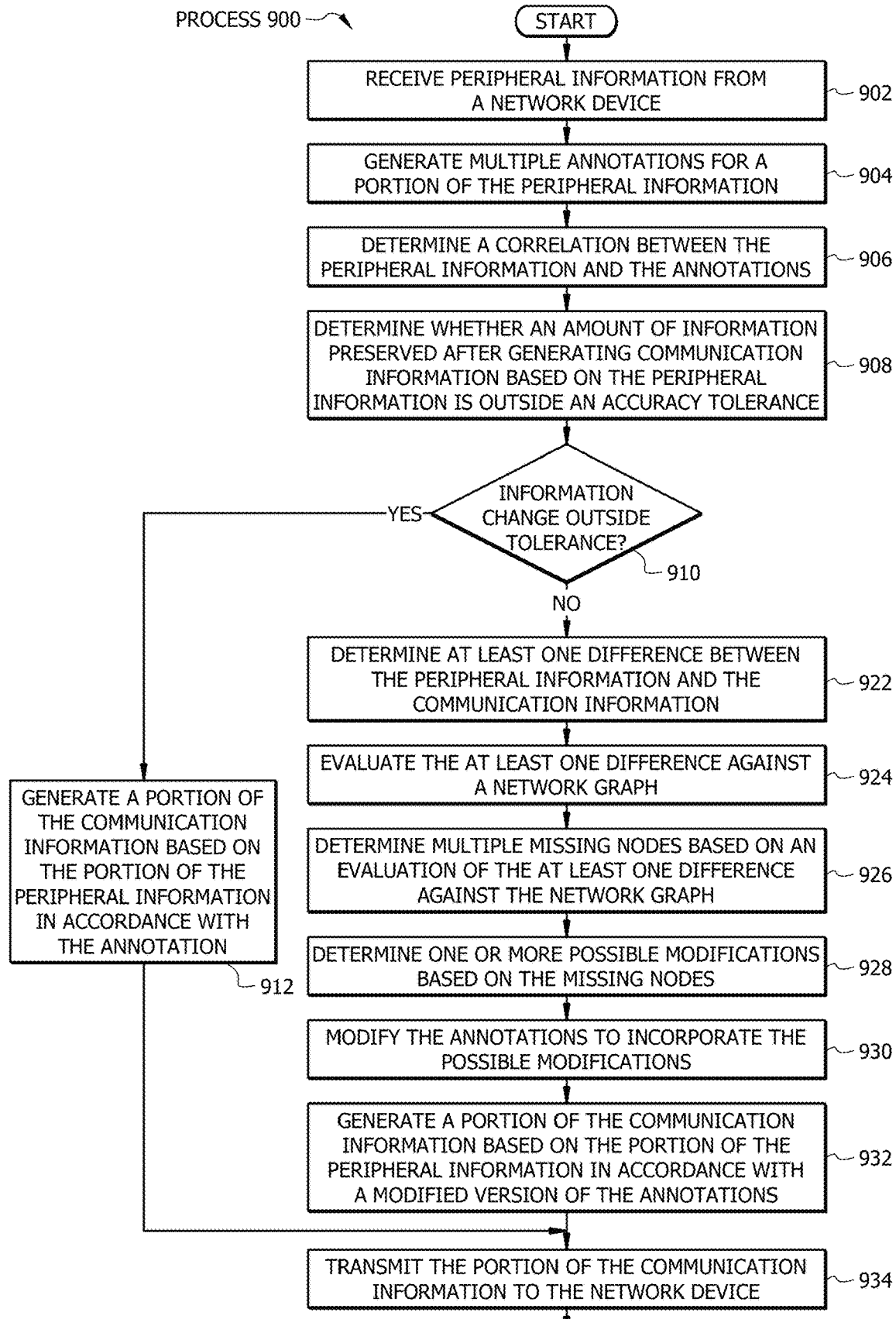
FIG. 9 illustrates an example flowchart of a method comprising the generation operations of FIG. 8 in accordance with one or more embodiments.
Figure 10:
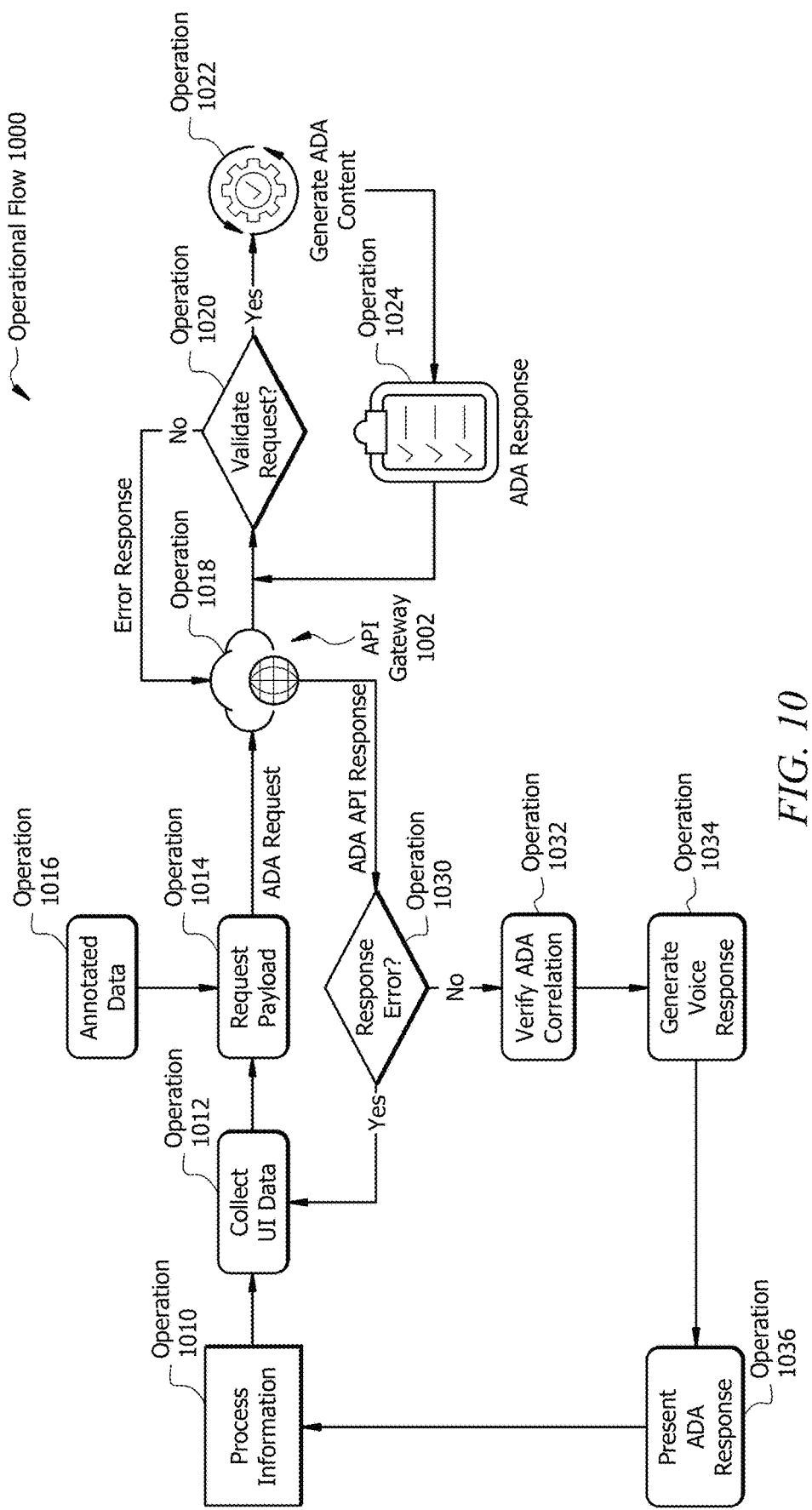
FIG. 10 illustrates one or more validation operations performed by the system of FIG. 1 in accordance with one or more embodiments.
Figure 11:
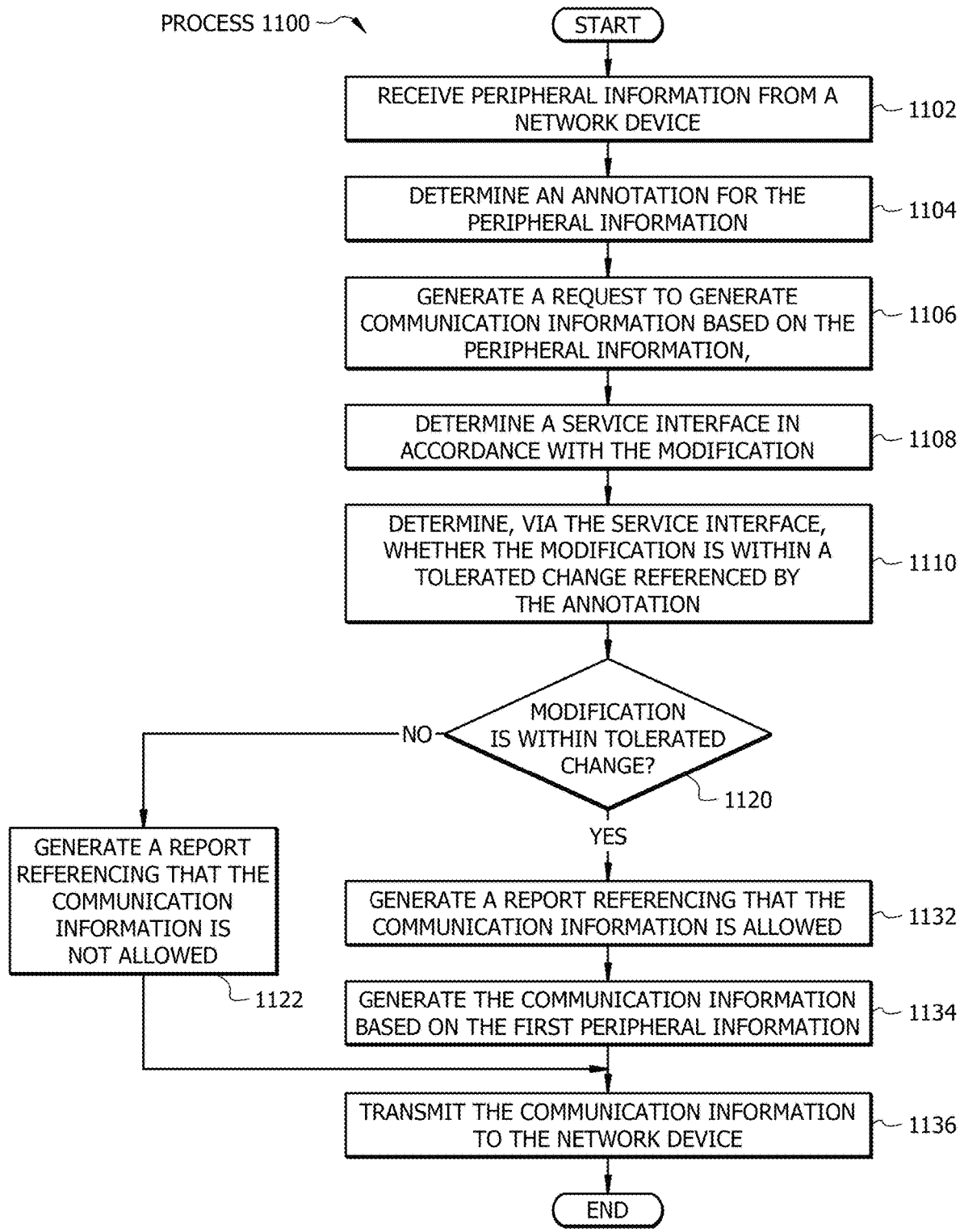
FIG. 11 illustrates an example flowchart of a method comprising the validation operations of FIG. 10 in accordance with one or more embodiments.

As described above, this disclosure provides various systems and methods to generate machine learning training samples using generative adversarial networks. The disclosure provides various systems and methods to recharacterize attributes in individual portions of images. Further, the disclosure provides various systems and methods to generate one or more nodes in network graphs based on characterization attributes in portions of images. The disclosure provides various systems and methods to annotate nodes in network graphs on demand. Then, the disclosure provides various systems and methods to analyze queries using machine learning-driven application programming interface (APIs). FIG. 1 illustrates a system 100 in which a server 102 is configured to perform one or more operations in a communication network. FIG. 2 illustrates an operational flow 200 comprising creation of one or more training samples as performed by the system 100 of FIG. 1. FIG. 3 illustrates a process 300 performed by the system 100 of FIG. 1 comprising one or more portions of the operational flow 200 of FIG. 2. FIG. 4 illustrates an operational flow 400 comprising attribute recharacterization in individual portions of images as performed by the system 100 of FIG. 1. FIG. 5 illustrates a process 500 performed by the system 100 of FIG. 1 comprising one or more portions of the operational flow 400 of FIG. 4. FIG. 6 illustrates an operational flow 600 comprising generation of one or more communication points in generative networks based on characterization attributes in portions of images as performed by the system 100 of FIG. 1. FIG. 7 illustrates a process 700 performed by the system 100 of FIG. 1 comprising one or more portions of the operational flow 600 of FIG. 6. FIG. 8 illustrates an operational flow 400 comprising annotation of communication points in generative networks on demand as performed by the system 100 of FIG. 1. FIG. 9 illustrates a process 900 performed by the system 100 of FIG. 1 comprising one or more portions of the operational flow 800 of FIG. 8. FIG. 10 illustrates an operational flow 1000 comprising analysis of queries using machine learning-driven APIs as performed by the system 100 of FIG. 1. FIG. 11 illustrates a process 1100 performed by the system 100 of FIG. 1 comprising one or more portions of the operational flow 1000 of FIG. 10.

System Overview

FIG. 1 illustrates an example system 100, in accordance with one or more embodiments.

The system 100 may comprise a server 102 configured to dynamically manage, control, monitor, and/or perform one or more operations in a communication network in one or more processes to generate American with Disabilities Act (ADA) content. The system 100 includes a server 102 communicatively coupled to a network device 108a, a network device 108b, a network device 108c, a network device 108d, a network device 108e, and a network device 108f (collectively, network devices 108) via a network 110. The network devices 108 may be user nodes configured to trigger exchanges of data and/or perform one or more communication operations with each other and/or with the server 102 via the network 110. The network devices 108 may be working nodes configured to receive instructions to perform one or more communication operations based on instructions received from the server 102. In some embodiments, some of the network devices 108 may be clustered together in one or more environments 112 (e.g., shown as an environment 112a and an environment 112b). Each of the network devices 108 may be associated with one or more corresponding operators. These operators are shown as a user 114a, a user 114b, a user 114c, a user 114d, a user 114e, and a user 114f (collectively, users 114) in the environments 112. In FIG. 1, the environment 112a is shown comprising the user 114a associated with the network device 108a, the user 114b associated with the network device 108b, and the user 114c associated with the network device 108c. The environment 112b is shown comprising the user 114d associated with the network device 108d, the user 114e associated with the network device 108e, and the user 114f associated with the network device 108f.

In one or more embodiments, the server 102 may comprise one or more databases 122, one or more server peripherals 124, one or more server processors 126, and at least one server memory 130 communicatively coupled to one another. In some embodiments, the server memory 130 may comprise instructions 132, one or more training operations 133, one or more generation operations 134, one or more analysis operations 135, one or more validation operations 136, one or more annotations 144, one or more modifications 145, one or more tolerances 146, one or more real samples 147, at least one reference repository 138 comprising multiple reference files 139 (shown as a reference file 139a, a reference file 139b, and a reference file 139c among others) comprising one or more reference portions 140, at least one training repository 141 comprising multiple training files 142 (shown as a training file 142a, a training file 142b, and a training file 142c among others), one or more adversarial network samples 148, one or more scenarios 149, one or more tags 150, one or more peripheral information 151, one or more correlations 152, one or more communication information 153, one or more historical data 154, one or more tagging commands 155, one or more network models 156, one or more formats 157, one or more labels 158, one or more entities 159, one or more machine learning (ML) algorithms 160 comprising one or more models 161, one or more artificial intelligence commands 162, at least one classifier 164, one or more requests 165, one or more services 166, one or more reports 167, one or more rules and policies 168, and one or more maintained information 169 (in ADA content).

In some embodiments, the system 100 may comprise one or more network graphs 170. The network graphs 170 may be communicatively coupled to the server 102 and/or the network devices 108 in the environments 112 via the network 110. In the example of FIG. 1, the network graphs 170 comprise one or more nodes 171 and one or more relation paths 172.

Referring to the network device 108a a non-limiting example, the network device 108a may comprise one or more device interfaces 180, one or more device peripherals 182, at least one device processor 184, and at least one device memory 186 communicatively coupled to one another. The device memory 186 may comprise device instructions 188, local information 190, and one or more local services 192.

System Components
Server

The server 102 is generally any device or apparatus that is configured to process data and communicate with computing devices (e.g., the network devices 108), additional databases, systems, and the like, via the one or more server peripherals 124 (i.e., a user interface or a network interface). The server 102 may comprise the server processor 126 that is generally configured to oversee operations of the processing engine. The operations of the processing engine are described further below in conjunction with the system 100 described in FIG. 1, the operational flow 200 described in FIG. 2, the process 300 described in FIG. 3, the operational flow 400 described in FIG. 4, the process 500 described in FIG. 5, the operational flow 600 described in FIG. 6, the process 700 described in FIG. 7, the operational flow 800 described in FIG. 8, the process 900 described in FIG. 9, the operational flow 1000 described in FIG. 10, and the process 1100 described in FIG. 11.

The server 102 comprises multiple databases 122 configured to provide one or more memory resources to the server 102 and the network devices 108. The server 102 comprises the server processor 126 communicatively coupled with the databases 122, the server peripherals 124, and the server memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to function as a halfway point in between services 166 and other tools or databases.

In one or more embodiments, the server peripherals 124 may be configured to enable wired and/or wireless communications. The server peripherals 124 may be configured to communicate data between the server 102 and network devices 108 (i.e., user devices, routers, and/or managed servers in the network 110), systems, or domain(s) via the network 110. For example, the server peripherals 124 may comprise a WI-FI interface, a LAN interface, a WAN interface, a modem, a switch, or a router. The server processor 126 may be configured to send and receive data using the server peripherals 124. The server peripherals 124 may be configured to use any suitable type of communication protocol. In some embodiments, the server peripherals 124 may be an admin console comprising a display configured to show a user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in a server cluster. The server cluster may be a group of managed servers that work together to provide scalability and higher availability for the services 166. In this regard, the services 166 are developed and deployed as part of at least one domain. The services 166 may be applications accessed via one or more dedicated application programming interfaces (APIs). In other embodiments, one instance of the managed servers in the middleware server domain may be configured as the server 102. The server 102 provides a central point for managing and configure the managed servers, any of the one or more services 166, and the one or more local services 192.

The at least one server processor 126 may comprise one or more processors communicatively coupled to the server memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processors 126 may be configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processors 126 are configured to execute various instructions. For example, the one or more server processors 126 are configured to execute the instructions 132 to implement the functions disclosed herein, such as some or all of those described with respect to FIGS. 1-11. In some embodiments, the functions described herein are implemented using logic units, FPGAs, ASICs, DSPs, or any other suitable hardware or electronic circuitry.

In one or more embodiments, the server peripherals 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server peripherals 124 may be configured to support any suitable type of communication protocol as would be appreciated by one of ordinary skill in the art.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the one or more training operations 133, the one or more generation operations 134, the one or more analysis operations 135, the one or more validation operations 136, the one or more annotations 144, the one or more modifications 145, the one or more tolerances 146, the one or more real samples 147, the at least one reference repository 138 comprising the multiple reference files 139 comprising the one or more reference portions 140, the at least one training repository 141 comprising the multiple training files 142, the one or more adversarial network samples 148, the one or more scenarios 149, the one or more tags 150, the one or more peripheral information 151, the one or more correlations 152, the one or more communication information 153, the one or more historical data 154, the one or more tagging commands 155, the one or more network models 156, the one or more formats 157, the one or more labels 158, one or more entities 159, the one or more ML algorithms 160 comprising the one or more models 161, the one or more artificial intelligence commands 162, the at least one classifier 164, the one or more requests 165, the one or more services 166, the one or more reports 167, the one or more rules and policies 168, and the one or more maintained information 169. The one or more ML algorithms 160 configured to train, create, and/or monitor the one or more models 161, the one or more AI commands 162, and/or any other data or instructions. The instructions 132 may comprise any suitable set of instructions, logic, rules, or code operable to execute the server processor 126.

In some embodiments, the training operations 133, the generation operations 134, the analysis operations 135, and/or the validation operations 136 may be executed by the server processor 126 configured to enable data objects comprising one or more data elements to be exchanged between the server 102, the network devices 108, and/or one or more additional devices communicatively coupled to the server 102 based on the one or more rules and policies 168. In one or more embodiments, the training operations 133, the generation operations 134, the analysis operations 135, and/or the validation operations 136 may be configured to indicate one or more data objects (e.g., via data object information) to be exchanged, modified, and/or secured between the server 102 and at least one of the network devices 108. The training operations 133, the generation operations 134, the analysis operations 135, and/or the validation operations 136 may be configured to generate and/or analyze one or more requests 165 and/or one or more reports 167. The reports 167 may comprise data indicating warnings and alerts among other information. In some embodiments, the reports 167 may be audio and/or visual signaling presented in the one or more server peripherals 124 and/or the one or more device peripherals 182. The one or more requests 165 may be one or more communications configured to provide triggers in the form of communication or control signals to start operations such as fetching the instructions 132 or running one or more of the training operations 133, the generation operations 134, the analysis operations 135, and/or the validation operations 136. The requests 165 may provide user information to the server 102 to indicate at least one user profile associated with one or more of the entitlements to access and/or modify any of the services 166 available in the server 102. The requests 165 may be configured to provide lists, security information, and configuration commands that the server 102 uses to set up a specific service 106 for one of the network devices 108. The requests 165 may comprise data that provides starting procedure configuration to the server 102. In one or more embodiments, the requests 165 may be optimized (e.g., simplified to a target state of efficiency) instructions that trigger establishing of a specific procedure in the server 102 and/or one or more of the network devices 108.

In one or more embodiments, the training operations 133, the generation operations 134, the analysis operations 135, and/or the validation operations 136 may be one or more operations performed and/or triggered by one or more services 166. The training operations 133, the generation operations 134, the analysis operations 135, and/or the validation operations 136 may be one or more operations comprising multiple stages and/or transitions at different services 166. For example, one or more of the training operations 133, the generation operations 134, the analysis operations 135, and/or the validation operations 136 may be configured to start at one service 166 that transitions to other services 166. For example, the server 102 may be configured to set up one or more of the training operations 133, the generation operations 134, the analysis operations 135, and/or the validation operations 136. In some embodiments, the training operations 133, the generation operations 134, the analysis operations 135, and the validation operations 136 may be configured to evaluate, modify, exchange, and/or create one or more of the annotations 144, the modifications 145, the tolerances 146, the real samples 147, the requests 165, the reference files 139, the training files 142, the adversarial network samples 148, the scenarios 149, the tags 150, the peripheral information 151, the correlations 152, the services 166, the reports 167, the communication information 153, the historical data 154, the tagging commands 155, the network models 156, the formats 157, the labels 158, information associated with the entities 159, the machine learning algorithms 160, the models 161, the AI commands 162, the classifier 164, the rules and policies 168, the maintained information 169, and/or any generated ADA content.

The training operations 133 may be configured to create, train, and/or modify one or more models 161 and/or one or more machine learning algorithms 160 to determine one or more approaches to generate ADA content within one or more levels of accuracy (e.g., thresholds and/or similarities, such as those described in reference to the tolerances 146). The training operations 133 may be configured to create, train, and/or modify one or more network graphs 170, one or more relation paths 172, and/or one or more network nodes 171 to determine one or more approaches to generate ADA content within the one or more levels of accuracy. The training operations 133 may be one or more processes comprising one or more operations configured to train one or more models 161 based on one or more outputs of the training operations 133, the generation operations 134, the analysis operations 135, and the validation operations 136. The training operations 133 may be configured to generate, supervise, and/or modify one or more of the models 161. The training operations 133 may be configured to structure, normalize, and/or index one or more of the files in the reference repository 138 and/or the training repository 141. The training operations 133 may be configured to create and/or modify the files in the reference repository 138 and/or the training repository 141. Further, the training operations 133 may be configured to generate, modify, and/or store one or more of the real samples 147, one or more of the adversarial network samples 148, and/or one or more rules and policies 168.

The generation operations 134 may be configured to generate ADA content based on received information. The generation operations 134 may be one or more processes comprising one or more operations configured to generate maintained information 169, one or more reports 167, and/or one or more models 161 based on one or more outputs of the training operations 133, the generation operations 134, the analysis operations 135, and the validation operations 136. The generation operations 134 may be configured to generate, supervise, and/or modify one or more of the reports 167. The generation operations 134 may be configured to structure, normalize, and/or index one or more of the files in the reference repository 138 and/or the training repository 141. The generation operations 134 may be configured to create and/or modify the files in the reference repository 138 and/or the training repository 141. Further, the generation operations 134 may be configured to generate, modify, and/or store one or more of the maintained information 169.

The analysis operations 135 may be configured to analyze generated ADA content accuracy. The analysis operations 135 may be one or more processes comprising one or more operations configured to analyze, generate analysis results, and/or reports 167 based on the maintained information 169, the labels 158, the historical data 154, and/or the communication information 153. The analysis operations 135 may be configured to evaluate integrity in ADA content generated/to be generated based on one or more outputs of the training operations 133, the generation operations 134, the analysis operations 135, and the validation operations 136. The analysis operations 135 may be configured to generate, supervise, and/or modify one or more of the network graphs 170. The analysis operations 135 may be configured to structure, normalize, and/or index one or more of the files in the reference repository 138 and/or the training repository 141. The analysis operations 135 may be configured to create and/or modify the files in the reference repository 138 and/or the training repository 141. Further, the analysis operations 135 may be configured to generate, modify, and/or store one or more of the annotations 144, the tags 150, the peripheral information 151, the correlations 152, and/or one or more rules and policies 168.

The validation operations 136 may be configured to evaluate one or more requests 165 associated with communication information 153 received by the server 102. The validation operations 136 may be one or more processes comprising one or more operations configured to validate integrity and/or content of the communication information 153 and/or the maintained information 169 based on one or more outputs of the training operations 133, the generation operations 134, the analysis operations 135, and the validation operations 136. The validation operations 136 may be configured to generate, supervise, and/or modify one or more of the annotations 144, the tags 150, and/or the labels 158. The validation operations 136 may be configured to structure, normalize, and/or index one or more of the files in the reference repository 138 and/or the training repository 141. The validation operations 136 may be configured to create and/or modify the files in the reference repository 138 and/or the training repository 141.

In one or more embodiments, reference repository 138 may be one or more repositories configured to store and/or facilitate exchange of reference information. The reference repository 138 may be configured to store and/or facilitate access to coded data and/or one or more representations of data instead of storing coded data. In this regard, the representations may be encoded in accordance with an encoder configured to identify and/or verify exchanged information. For example, the reference repository 138 may comprise one or more representations of the reference files 139. As the reference files 139 are created and/or obtained, the server processor 126 may be configured to process the reference files 139 in accordance with the one or more aforementioned operations. The one or more reference files 139 may indicate one or more changes in the behavior associated with one or more of the entities 159. In one or more embodiments, the reference files 139 are information data representative on one or more aspects of the communication information 153 and/or the maintained information 169 modified, generated, and/or evaluated by the one or more entities 159 via the network 110. The reference files 139 may be data that represents extracted information and/or summarized information of one or more information elements associated with one or more operations attempted and/or performed by the server 102, the network graphs 170, and/or the network devices 108. In the example of FIG. 1, the reference files 139 may be business metadata used by one of the applications and may be dynamic in nature. The reference files 139 may be individual aspects of information exchanged in the network 110. The one or more reference portions 140 may be individual data in one or more data objects. The reference portions 140 may be alphanumeric bitstrings comprising a specific format. The reference portions 140 may be data information configured to reference data objects stored in a specific database. The one or more reference portions 140 may be one or more tables, ledgers, files, and/or data documents comprising information relating to one or more data objects. In some embodiments, each of the training operations 133, the generation operations 134, the analysis operations 135, and/or the validation operations 136 may be configured to modify one or more data elements and/or one or more data records associated with creating ADA content. The server 102 may be configured to keep track and/or monitor one or more of the data elements and/or the data records as the training operations 133, the generation operations 134, the analysis operations 135, and/or the validation operations 136 transition received content into ADA content. The reference portions 140 may be data elements and/or data records obtained as part of one or more communication operations.

In one or more embodiments, the training repository 141 may be one or more repositories configured to store and/or facilitate exchange of training information. The training repository 141 may be configured to store and/or facilitate access to coded data and/or one or more representations of data instead of storing coded data. In this regard, the representations may be encoded in accordance with an encoder configured to identify and/or verify exchanged information. For example, the training repository 141 may comprise one or more representations of the training files 142. As the training files 142 are created and/or obtained, the server processor 126 may be configured to process the training files 142 in accordance with the one or more aforementioned operations. The one or more training files 142 may indicate one or more changes representative of patterns in the behavior associated with one or more of the entities 159. In one or more embodiments, the training files 142 are information data representative on one or more aspects of the communication information 153 and/or the maintained information 169 modified, generated, and/or evaluated by the one or more entities 159 via the network 110. The training files 142 may be data that represents extracted information and/or summarized information of one or more information elements associated with training one or more operations attempted and/or performed by the server 102, the network graphs 170, and/or the network devices 108. In the example of FIG. 1, the training files 142 may be training metadata used by one of the applications and may be dynamic in nature. The training files 142 may be training material representative of individual aspects of information exchanged in the network 110. The one or more randomized portions 143 may be training materials of individual data in one or more data objects. The randomized portions 143 may be alphanumeric bitstrings comprising a specific format. The randomized portions 143 may be data information configured to reference data objects stored in a specific database. The one or more randomized portions 143 may be one or more tables, ledgers, files, and/or data documents randomly generated comprising information relating to one or more data objects. In some embodiments, each of the training operations 133, the generation operations 134, the analysis operations 135, and/or the validation operations 136 may be configured to modify one or more data elements and/or one or more data records associated with creating training information used to generate ADA content. The server 102 may be configured to keep track and/or monitor one or more of the data elements and/or the data records as the training operations 133, the generation operations 134, the analysis operations 135, and/or the validation operations 136 transition received content into training ADA content. The randomized portions 143 may be training versions of data elements and/or data records randomly generated using one or more models 161 and/or one or more ML algorithms 160. The models 161 and/or the machine learning algorithms 160 configured and/or trained to generate the randomized portions 143 may be trained using one or more of the communication information 153, one or more of the maintained information 169, and/or one or more additional elements stored in the server memory 130 and/or the device memory 186.

In one or more embodiments, the one or more annotations 144 may be one or more alphanumeric reference strings of information (e.g., data) configured to convey information about a resource and/or associations between resources. The annotations 144 may be one or more structured models and/or formats to enable data indicators representative of one or more aspects of specific documents, image, and/or text to be shared and/or reused across different hardware and/or software platforms. In some embodiments, the annotations 144 may be configured to reference one or more tolerated changes to one or more reference portions 140 in one or more reference files 139. In one or more embodiments, the server 102 may be configured to generate one or more real samples 147 based at least in part upon the reference portions 140 and/or one or more related annotations 144. The real samples 147 may comprise a modified version of the reference portions 140 within a given annotation 144. The server 102 may be configured to determine a specific annotation 144 associated with a specific reference file 139. The server 102 may be configured to determine a specific annotation 144 associated with multiple reference files 139.

The one or more modifications 145 may be recommendations presented to the network devices 108 based on the one or more of the operations performed in the training operations 133, the generation operations 134, the analysis operations 135, and/or the validation operations 136. The modifications 145 may comprise one or more dynamic configuration commands to modify one or more data elements and/or data records associated with the training operations 133, the generation operations 134, the analysis operations 135, and/or the validation operations 136. In one or more embodiments, the dynamic configuration commands may comprise the one or more application configuration parameters configured to control operations of the services 166 and/or the local services 192. Each configuration command of the application configuration parameters may be configured to dynamically provide control information to perform one or more of the operations based at least in part upon the analyzed data during the training operations 133, the generation operations 134, the analysis operations 135, and/or the validation operations 136. The modifications 145 may provide preventive solutions to remove, reduce, and/or eliminate anomalies as the training operations 133, the generation operations 134, the analysis operations 135, and/or the validation operations 136 are completed. In any integrated system where multiple applications (e.g., services 166) interact with each other, the system 100 may thoroughly perform impact checks of any changes to operations and whether modifications 145 are needed to ensure any change in data is not impacting performance of the services 166.

The one or more tolerances 146 may be one or more specific numbers and/or number ranges associated with a specific parameter and/or indicator. The one or more tolerances 146 may be a specific value representing a higher boundary or a lower boundary. The one or more tolerances 146 may be one or more threshold ranges comprising higher boundaries and lower boundaries. The one or more tolerances 146 may be a percentage value representing a similarity and/or a difference between one or more values assigned as tolerances for current configuration parameters, one or more reference data element values, and/or one or more reference data record values. The one or more tolerances 146 may be determined based on information associated with the requests 165. The one or more tolerances 146 may be determined dynamically over time. The one or more tolerances 146 may be predefined and/or predetermined in accordance with information in activity associated with one or more of the requests 165. In some embodiments, the server 102 may be configured to calculate the one or more tolerances 146 based on information obtained via the server peripherals 124 and/or device peripherals 182.

The one or more real samples 147 and/or the one or more adversarial network samples 148 may comprise information associated with one or more of the communication operations, information associated with one or more entities 159, and one or more tracked activities associated with the entities 159. The real samples 147 and/or the adversarial network samples 148 may comprise information provided by and/or obtained from the entities 159 during one or more communication operations in the network 110. The server 102 may be configured to perform one or more retrieving operations configured to determine real samples 147 and/or the adversarial network samples 148 based on the tracked activities from the communication operations and generate one or more reports associated with interactions of the entities 159 in the network 110. The real samples 147 and/or the adversarial network samples 148 may be collected continuously without interruptions and/or periodically over time and/or periods of time. The real samples 147 and/or the adversarial network samples 148 may comprise one or more datapoints referencing one or more physical phenomena and/or aspects of a portion of one or more users 114. The real samples 147 and/or the adversarial network samples 148 may be obtained via one or more ML models 161 configured with a natural language processing (NPL) that identifies conversations associated with one or more of the users 114. The real samples 147 and/or the adversarial network samples 148 may be analyzed, generated, modified, and/or transmitted as part of performing one or more of the training operations 133, the generation operations 134, the analysis operations 135, and/or the validation operations 136. The real samples 147 and/or the adversarial network samples 148 may comprise multiple sound, text, and/or action data samples. Each data sample may comprise a magnitude and a duration. The real samples 147 and/or the adversarial network samples 148 may be configured to reference one or more aspects of data and/or actions associated with the communication operations in the system 100.

The real samples 147 may be one or more representations of information configured to provide real aspects of one or more portions of a file. In some embodiments, the server 102 may be configured to generate real samples 147 based at least in part upon reference portions 140 of one or more reference files 139 and/or one or more of the annotations 144. The real samples 147 may comprise one or more modified versions of the reference portions 140 within the annotations 144 and/or associated with the one or more annotations 144. The server 102 may be configured to execute the ML algorithm 160 to determine whether any one or more real samples 147 at least partially match one or more adversarial network samples 148. The server 102 may be configured to train one or more models 161 using one or more of the real samples 147 and/or one or more of the adversarial network samples 148.

The adversarial network samples 148 may be one or more representations of information configured to provide generated aspects of one or more portions of a file. In some embodiments, the server 102 may be configured to generate adversarial network samples 148 based at least in part upon randomized portions 143 of one or more training files 142 and one or more evaluation commands. The server 102 may be configured to execute a machine learning algorithm 160 to determine whether one or more adversarial network samples 148 at least partially matches one or more real samples 147. In response to determining that the adversarial network samples 148 at least partially match the real sample 147, the server 102 is configured to train one or more models 161 using the real samples 147 and/or the adversarial network samples 148.

The real samples 147 and the adversarial network samples 148 may be used to create, modify, and/or maintain one or more training processes. The real samples 147 and the adversarial network samples 148 may be generated as part of one or more sections of a generative adversarial network (GAN). The adversarial network may comprise a first generator section configured to generate the real samples 147 and a second generator section configured to generate the adversarial network samples 148. The adversarial networks may be configured to learn to create data representative of false information (e.g., information known to be inaccurate) to evaluate as one or more examples of negative data and/or true information (e.g., information known to be accurate) to evaluate as one or more examples of positive data. The adversarial networks may be configured to train one or more models 161 based on the real samples 147 and the adversarial network samples 148. The server 102 may train the adversarial networks based on one or more random inputs. The server 102 may comprise a generator network configured to transform the random inputs into one or more data instances, a discriminator network configured to classify generated data, and at least one classifier 164 configured to determine whether trained data matches real data. The server 102 may be configured to award the generator for successful generation of training samples and/or penalize the generator for unsuccessful generation of training samples.

The one or more scenarios 149 may be one or more representation of changes and/or modifications that a document and/or image may experience between two endpoints. The server 102 may be configured to determine one or more end-to-end scenarios 149 comprising one or more modifications 145 to one or more reference portions 140 of one or more reference files 139. In some embodiments, the server 102 may be configured to generate one or more real samples 147 based at least in part upon one or more reference portions 140, one or more annotations 144, and one or more end-to-end scenarios 149. The real samples 147 may comprise a modified version of the reference portion 140 within the annotations 144 and/or that is modified in accordance with the end-to-end scenarios 149.

The one or more tags 150 may be one or more indicators configured to reference that a document and/or an image comprises one or more portions that are capable of transformation from one format to another format. The tags 150 may be configured to reference that multiple portions of text are configured to be transformed into sound. The server 102 may be configured to generate one or more tags 150 for one or more portions of peripheral information 151 as information is obtained by the server 102. The tags 150 may be configured to comprise guidance to generate communication information 153 that correlates to the peripheral information 151. In some embodiments, the server 102 may be configured to determine one or more correlations 152 between one or more peripheral information 151 and the tags 150. The correlations 152 may be one or more relations between a previous version of the documents and/or images and a second version of the documents and/or images. In some embodiments, the server 102 may be configured to determine correlations 152 that reference a first amount of information preserved in communication information 153 that matches peripheral information 151 after the communication information 153 is generated based on the peripheral information 151.

In one or more embodiments, the one or more peripheral information 151 may be some, or all, information received and/or transmitted between the server 102 and one or more network devices 108 and/or the network graphs 170. In one or more embodiments, the communication information 153 may be one or more data elements and/or information elements in one or more formats 157. The communication information 153 may be one or more transformed data elements and/or information elements that are transformed by the server 102 between two or more formats 157.

The historical data 154 may be historic information associated with one or more communication exchanged between the server 102 and one or more network devices 108 in a communication network comprising several network devices 108. The historical data 154 may comprise one or more historic indicators representing one or more trends associated with power consumption for a specific network device 108, a group of communication network devices 108, and/or several network devices 108 in the communication network.

The tagging commands 155 may be one or more indicators configured to provide information associated with information that is exchanged in the network 110. The tagging commands 155 may be stored in one or more formats. The server processor 126 may be configured to generate the one or more tagging commands 155 based on one or more of the operations. In this regard, the tagging commands 155 may be information indicating modifications and/or assignments of network resources in the network 110. The tagging commands 155 may be replaced, updated, and/or modified dynamically. The tagging commands 155 may be replaced, updated, and/or modified periodically. The tagging commands 155 may comprise one or more triggers configured to enable access between the server 102 and/or the network devices 108. The tagging commands 155 may be generated to modify routing of requests 165 in the network 110. In some embodiments, the server 102 may be configured to determine one or more tagging commands 155 based on one or more evaluations of at least one difference against the historical data 154. The tagging commands 155 may comprise one or more possible modifications 145 to the tags 150 and/or to modify the tags 150 to incorporate the possible modifications 145. In some embodiments, the server 102 may be configured to train the one or more machine learning models 161 using the tags 150 and the tagging commands 155.

The network models 156 may be one or more types of networks in which the server 102 is configured to transform information between two or more formats 157. For example, the network models 156 may comprise neural; network models, GANs, and/or one or more networks comprising one or more ML models 161.

The one or more formats 157 may be one or more representations of the information. The one or more formats 157 may comprise one or more representations and/or information mapping layouts. The formats 157 may be one or more aspects of the information. The formats 157 may be one or more image formats of a sound sample, an image sample, and/or alphanumeric format associated with a data file. The formats 157 may be evaluated and/or analyzed over time. The formats 157 may be configured to indicate one or more data types associated with one or more information elements. The data types may indicate a source corresponding to a specific information element. The data types may comprise one or more data identifiers associated for each information element and/or portion of information. The data types may be information specific for each datapoint in one or more information portions.

The one or more labels 158 may be configured to indicate one or more sections of a document, image, and/or sound. The server 102 may be configured to generate one or more labels 158 referencing one or more amounts of information in communication information 153. Further, the server 1202 may be configured to execute the machine learning algorithm 160 to determine whether the amounts of information referenced by the labels are within an accuracy tolerance 146 and, in response to determining that the amounts of information are within the accuracy tolerance 146, train the one or more machine learning models 161 using the reference information, the communication information, and the labels 158.

The one or more entities 159 may be configured to represent one or more aspects of a document as represented by one or more tags 150 and/or one or more labels 158. In some embodiments, the server 102 may be configured to determine one or more entities 159 based on the reference information and one or more annotations 144. The entities 159 may be configured to reference different aspect of information to be translated into one or more nodes 171 of the one or more network graphs 170. The server 102 may be configured to establish network nodes 171 for the entities 159.

In one or more embodiments, the ML algorithms 160 may be executed by the server processor 126 to evaluate the training operations 133, the generation operations 134, the analysis operations 135, and/or the validation operations 136. Further, the ML algorithms 160 may be configured to interpret and transform the requests 165 and/or the instructions 132 into structured data sets and subsequently stored as files or tables. The ML algorithms 160 may cleanse, normalize raw data, and derive intermediate data to generate uniform data in terms of encoding, format, and data types. The ML algorithms 160 may be executed to run user queries and advanced analytical tools on the structured data and/or the unstructured data in accordance with one or more ML models 161. The ML algorithms 160 may be configured to generate the one or more AI commands 162 based on one or more results of the training operations 133, the generation operations 134, the analysis operations 135, and/or the validation operations 136. The AI commands 162 may be parameters that proactively trigger one or more of the training operations 133, the generation operations 134, the analysis operations 135, and/or the validation operations 136. The AI commands 162 may be combined with the existing instructions 132 to dynamically trigger and/or perform one or more data authentication operations and/or some or all of the training operations 133, the generation operations 134, the analysis operations 135, and/or the validation operations 136. The AI commands 162 may be configured to trigger one or more cognitive AI operations in accordance with one or more ML models 161. The ML models 161 may be trained by the one or more ML algorithms 160 based on historic information associated with any data exchange operations performed by the services 166 and/or the server 102.

The at least one classifier 164 may be hardware and/or software, executed by hardware, to classify, route, and/or modify real samples 147 and/or adversarial network samples 148. The classifier 164 may be configured to distinguish real data from the data created by the server 102. The training data may be received from real data instances, such as real images and/or documents. The classifier 164 uses these instances as positive examples during training. The training data may be received from fake data instances, such as real images and/or documents. The classifier 164 uses these instances as negative examples during training. The classifier 164 may be configured to train one or more models 161 in accordance with one or more evaluation procedures and/or protocols.

In one or more embodiments, the requests 165 may be one or more information strings, alphanumeric data, and/or configuration commands to be exchanged in a data network. The one or more requests 165 may be configured to trigger one or more of the operations in the system 100. The requests 165 may be exchanged in bulk or individually over the network 110. The requests 165 may be one or more communications configured to provide triggers in the form of communication or control signals to start operations such as fetching the instructions 132 or performing the one of the operations. The requests 165 may provide user information to the server 102 to indicate at least one user profile associated with one or more entitlements to access and/or modify any of the services 166 available in the server 102.

In one or more embodiments, the server 102 and/or the services 166 are configured to perform one or more operations where data elements and/or data records are evaluated as data exchange operations are transitioned from one service 166 to another. The server 102 and/or the services 166 may be configured to perform real-time data reconciliation and synchronization for operations and starting data across applications (e.g., services) and devices using multi-level operations. The services 166 may be one or more applications accessible via one or more APIs to perform one or more specific operations.

The one or more reports 167 may comprise data indicating warnings and alerts among other information. In some embodiments, the one or more reports 167 may be audio and/or visual signaling presented in the one or more server peripheral 124 and/or the one or more device peripherals 182. In one or more embodiments, the one or more reports 167 may comprise a release roadmap and/or plan to incorporate the one or more possible anomaly corrections and/or suggestions into one or more configuration parameters. In some embodiments, the one or more reports 167 may be generated to indicate one or more instructions 132 to incorporate the one or more possible modification suggestions into the configuration parameters.

In some embodiments, the rules and policies 168 may be security configuration commands or regulatory operations predefined by an organization or one or more users 114. In one or more embodiments, the rules and policies 168 may be dynamically defined by the server 102 and/or one or more users 114. The rules and policies 168 may be prioritization rules configured to instruct one or more network devices 108 to establish one or more application configuration parameters or perform one or more application operations in the system 100 in a specific order. The one or more rules and policies 168 may be predetermined or dynamically assigned by a corresponding user 114 or an organization associated with the user 114.

The maintained information 169 may be one or more data elements, portions of images, and/or portions of documents that are preserved as peripheral information 151 comprising a first format is transformed into communication information 153 comprising a second format. The server 102 may be configured to evaluate and/or analyze the maintained information 169 in accordance with one or more rules and policies 168. The server 102 may be configured to determine whether the maintained information 169 is a proper response comprising ADA content in accordance with one or more rules and policies 168. In one or more embodiments, the server 102 is configured to receive the peripheral information 151 in an image format and generate an ADA response comprising a sound format.

Network

The network 110 facilitates communication between and amongst the various devices of the system 100. The network 110 may be any suitable network operable to facilitate communication between the server 102 and the network devices 108 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Network Devices

In one or more embodiments, each of the network devices 108 (e.g., the network devices 108a-108f) may be any computing device configured to communicate with other devices, such as the server 102, other network devices 108 in the environment 112a and the environment 112b, databases, and the like in the system 100. Each of the network devices 108 may be configured to perform specific functions described herein and interact with one or more network devices 108a-108f in the environments 112. Examples of the network devices 108 comprise, but are not limited to, a laptop, a computer, a smartphone, a tablet, a smart device, an IoT device, a simulated reality device, an augmented reality device, a router, a managed server, or any other suitable type of device.

The network devices 108 may be hardware configured to create, transmit, and/or receive information. The network devices 108 may be configured to receive inputs from a user, process the inputs, and generate data information or command information in response. The data information may include documents or files generated using a user interface. The command information may include input selections/commands triggered by a user using a peripheral component or one or more device peripherals 182 (i.e., a keyboard) or an integrated input system (i.e., a touchscreen presenting a user interface). The network devices 108 may be communicatively coupled to the server 102 via a network connection (i.e., device interface 180 in the server 102). The network devices 108 may transmit and receive data information, command information, or a combination of both to and from the server 102 via the device interface 180. In one or more embodiments, the network devices 108 is configured to exchange data, commands, and signaling with the server 102. In some embodiments, the network devices 108 are configured to trigger the start of one or more communication operations. The network devices 108 may be configured to trigger network devices to perform one or more communication operations. In one or more embodiments, while FIG. 1 shows the network device 108b, and the network device 108c in the environment 112a, a given environment 112a may comprise less or more network devices 108.

In one or more embodiments, referring to the network device 108a as a non-limiting example of the network devices 108, the network device 108a may comprise one or more device interfaces 180, one or more device peripherals 182, a device processor 184, and a device memory 186. The device interfaces 180 may be any suitable hardware or software (e.g., executed by hardware) to facilitate any suitable type of communication in wireless or wired connections. These connections may comprise, but not be limited to, all or a portion of network connections coupled to additional network devices 108b-108f, the server 102, the Internet, an Intranet, a private network, a public network, a peer-to-peer network, the public switched telephone network, a cellular network, a LAN, a MAN, a WAN, and a satellite network. The device interfaces 180 may be configured to support any suitable type of communication protocol.

In one or more embodiments, the one or more device peripherals 182 may comprise audio devices (e.g., speaker, microphones, and the like), input devices (e.g., keyboard, mouse, and the like), or any suitable electronic component that may provide a modifying or triggering input to the network device 108a. For example, the one or more device peripherals 182 may be speakers configured to release audio signals (e.g., voice signals or commands) during media playback operations. In another example, the one or more device peripherals 182 may be microphones configured to capture audio signals from the user 114a. In one or more embodiments, the one or more device peripherals 182 may be configured to operate continuously, at predetermined time periods or intervals, or on-demand.

The device processor 184 may comprise one or more processors communicatively coupled to and in signal communication with the device interfaces 180, the device peripherals 182, and the device memory 186. The device processor 184 is any electronic circuitry, including, but not limited to, state machines, one or more CPU chips, logic units, cores (e.g., a multi-core processor), FPGAs, ASICs, or DSPs. The device processor 184 may be a programmable logic device, a microcontroller, a microprocessor, or any suitable combination of the preceding. The one or more processors in the device processor 184 are configured to process data and may be implemented in hardware or software executed by hardware. For example, the device processor 184 may be an 8-bit, a 16-bit, a 32-bit, a 64-bit, or any other suitable architecture. The device processor 184 comprises an ALU to perform arithmetic and logic operations, processor registers that supply operands to the ALU, and store the results of ALU operations, and a control unit that fetches software instructions such as device instructions 188 from the device memory 186 and executes the device instructions 188 by directing the coordinated operations of the ALU, registers, and other components via a device processing engine (not shown). The device processor 184 may be configured to execute various instructions. For example, the device processor 184 may be configured to execute the device instructions 188 to implement functions or perform operations disclosed herein, such as some or all of those described with respect to FIGS. 1-11. In some embodiments, the functions described herein are implemented using logic units, FPGAs, ASICs, DSPs, or any other suitable hardware or electronic circuitry.

In one or more embodiments, the device memory 186 may comprise multiple local operation data, one or more local information 190, and/or one or more local services 192 associated with the server 102. The local operation data may be data configured to enable one or more data processing operations such as those described in relation with the server 102. The local operation data may be partially or completely different from those comprised in the server memory 130.

The local information 190 may be one or more of the peripheral information 151, the communication information 153, and/or the maintained information 169. The local services 192 may be one or more of the services 166 described in relation with the server 102. In some embodiments, the local services 192 may be partially or completely different from those comprised in the server memory 130. As described above, the services 166 performing the training operations 133, the generation operations 134, the analysis operations 135, and/or the validation operations 136 may be hosted at the server 102 and/or one or more of the network devices 108.

Network Graphs

In one or more embodiments, the network graphs 170 comprise peer-to-peer and/or decentralized networking protocols and/or blockchain protocols that enable development of serverless applications. The network graphs 170 may include multiple electronic components or devices (i.e., nodes 171) comprising specific node data. The nodes 171 may not be required to store or validate all data in the network graphs 170. Instead, validation of each node's data may be obtained via peer accountability.

In some embodiments, the nodes 171 may include own data and a reference to all other data in the network graphs 170 in accordance with rules and policies 168 preestablished by an electronic component or device outside the network graphs 170 (e.g., one or more servers, such as the server 102). These rules and policies 168 may determine how the nodes 171 interact with each other and the server 102. The rules and policies 168 may be updated dynamically or periodically with additional data received as updates via one or more planning components (e.g., electronic devices or components configured to provide updates to the rules and policies 168). The updates may be triggered by a perceived lack of knowledge level in the nodes 171. A perceived knowledge level in the nodes 171 may be identified via node scores (not shown) received from the server 102 as feedback.

In one or more embodiments, each node (i.e., out of nodes 171) in the network graphs 170 includes knowledge-specific information and information associated with peer accountability and a perceived knowledge level. Each node 171 may be configured to perform one or more neuro-symbolic processing operations that evaluate an overall format 157 of the information. Specifically, referencing a node 171 as a non-limiting example, includes rules and policies 168 and/or one or more data exchange controls. The data exchange controls may include information corresponding to at least one knowledge domain configured to evaluate aspects of the information. In some embodiments, the nodes 171 may be generated in accordance with one or more entities 159. The nodes 171 may be communicatively coupled to one another in accordance with one or more relation paths 172 that relate the nodes 171 to one another.

In other embodiments, each of the nodes 171 includes a processor (not shown) configured to provide updates corresponding to specific data exchange controls. The processor in the nodes 171 may be configured to provide updated responses directly to the server processor 126. Further, a processor of the nodes 171 may be configured to determine one or more knowledge aspects as related by one or more relation paths 172. The network graphs 170 may be graph convolutional networks (GCNs), generative adversarial networks (GANs), and/or one or more neural networks.

Examples of Practical Applications

In a first example, the server 102 may be configured to generate ADA content based on received information (e.g., the peripheral information 151) comprising one or more anomalies. Herein, anomalies may comprise text and/or image data that overlaps, blurs, and/or otherwise is not legible by a human. The server 102 may be configured to determine when raw information received is overlapped, separate overlapped information elements, and generate ADA content based on the separated version of the information elements. For example, in cases in which images comprise rows of text that overlap one another, the server 102 may be configured to use one or more of the operations described in reference to FIGS. 1-11 to determine individual strings of text in the image, separate the individual strings of text, and process an updated version of the image comprising the separated strings of text to determine corresponding ADA content. In turn, the ADA content may be generated to match the updated version of the image to provide accurate versions of content found in the original information received by the server 102.

In some embodiments, the server 102 may be configured generate ADA content within one or more target accuracy values using ML algorithms 160 that are trained using prepared ADA content previously determined to comprise maintained information 169 that matches received information (e.g., peripheral information 151) within a predefined similarity tolerance 146. To match within a predetermined tolerance may mean that specific maintained information 169 is within a percentage of similarity with received information such that ADA content generated using the maintained information 169 matches an intent associated with the received information.

To prepare ADA data training materials, the server 102 may be configured to gather one or more requirement information and one or more design information of one or more projects that comprise existing ADA content, collect one or more annotations 144 and corresponding ADA content for each end-to-end flow associated to one or more unique scenarios 149, and build one or more ADA content repositories (e.g., the reference repository 138) to generate one or more real samples 147 using the content in ADA repository. To generate one or more training models 161, the server 102 may be configured to create a random vector for each sample in the ADA repository, execute one or more ML algorithms 160 in accordance with one or more generator models 161 to generate one or more adversarial network samples 148 using the random vector, and execute one or more ML algorithms 160 in accordance with one or more discriminator model 161 to validate adversarial network samples 148 against real samples 147. If the validation fails, the server 102 may be configured to train the models 161 using another iteration of the samples. The server 1023 may be configured to continue one or more operations until a loss meets an acceptable threshold (e.g., tolerance 146). To modify the accurately generate the ADA content, the server is configured to collect peripheral information 151 along with content annotations 144, make an ADA API call, regenerate a request payload if error response is received or otherwise proceed to pass the generated content to a validation engine. At this stage, the server 102 may be configured to check a correlation accuracy in generated ADA content. Herein, maintained information 169 may be evaluated against one or more tolerances 146 to determine whether ADA content is accurate. If accuracy is not acceptable, the server 102 may be configured to route a request 165 to a GAN model 161 to impute and/or add missing annotations 144 and/or data to the peripheral information 151. If accuracy is acceptable, the server 102 may be configured to route the ADA content to an audio output generator and present the audio output using one or more of the server peripherals 124 and/or one or more of the device peripherals 182.

As described above, the server 102 is configured to provide ADA compliant output validation and real-time imputation of documents and/or images using trained GAN models 161. Herein, the server 102 decouples ADA content generation operations into micro-services and generates and validates ADA content on-demand prior to presenting the ADA content to one or more peripherals of the server 102 and/or thew network devices 108. The server 102 may control some, or all, operations in ADA content generation life cycle.

In a second example, the server 102 may be configured to generate ADA content based on received information (e.g., the peripheral information 151) comprising one or more anomalies. Herein, anomalies may comprise text and/or image data that is not determined in to be included in received communication. The server 102 may be configured to check raw information multiple times with the aim of identified all tagged data elements in text and/or an image, cluster tag elements in one or more knowledge graphs, and evaluate the knowledge graphs (e.g., network graphs 170) to determine whether the clusters comprise complete ideas, sentences and/or thoughts. For example, in cases in which images comprise rows of text that are obfuscated, covered, and/or erased by markings (e.g., seals, communication stamps, and the like), the server 102 may be configured to use one or more of the operations described in reference to FIGS. 1-11 to determine missing individual strings of text in the image, predict the content in the missing individual strings of text, and process an updated version of the image comprising the individual strings of text to determine corresponding ADA content. In turn, the ADA content may be generated to match the updated version of the image to provide accurate versions of content found in the original information received by the server 102.

In some embodiments, the server 102 may be configured generate ADA content within one or more target accuracy values using ML algorithms 160 that are trained using prepared ADA content previously determined to comprise maintained information 169 that matches received information (e.g., peripheral information 151) within a predefined similarity tolerance 146. To match within a predetermined tolerance may mean that specific maintained information 169 is within a percentage of similarity with received information such that ADA content generated using the maintained information 169 matches an intent associated with the received information.

To building network graphs 170 and path validations, the server 102 may be configured to gather one or more requirement information and one or more design information of one or more projects that comprise existing ADA content, collect one or more annotations 144 and corresponding ADA content for each end-to-end flow associated to one or more unique scenarios 149, and build one or more ADA content repositories with one or more scenarios 149 mapped to one or more possible operations. In some embodiments, the server 102 may be configured to generate one or more labels 158 associated with an accuracy of each data flow. The server 102 may be configured to derive network nodes 171 from the labeled data, establish node connections (e.g., via one or more relation paths 172), and build one or more network graphs 170. The server 102 may be configured to generate relation paths 172 for each of the labeled operations, generate ADA content, and validate the ADA content accuracy against labeled data. At each instance the ADA content is generated, the server 102 may be configured to determine whether the ADA content comprises maintained information 169 that matches received information within a predefined threshold. To code one or more annotations 144 using the network graphs 170, the server 102 is configured to load one or more serialized network models 156, collect peripheral information receiving information from one or more peripherals (e.g., movement and/or selections in a screen by a user) along with one or more code annotations 144 for one or more of the tags 150. The server 102 may be configured to build nodes 171 and relation paths 172 using annotated versions of the tags 150 in code, generate ADA content and verify the accuracy of the ADA content. Herein, maintained information 169 may be evaluated against one or more tolerances 146 to determine whether ADA content is accurate. If accuracy is not acceptable, the server 102 may be configured to identify possible missing nodes 171 in a network graph 170 representative of the ADA content and impute them with virtual annotated nodes 171, generate another iteration of the ADA content using the virtual annotated nodes 171, and route the generated ADA content for broadcast. Once accurate ADA content is generated and broadcasted, the server may be configured to train one or more new and/or existing network models 156 with updated code tags 150.

As described above, the server 102 is configured to detect non-ADA compliant unannotated content and perform real-time tagging to generate accurate ADA content. Herein, the server 102 may be configured to pre-validate the ADA content before the ADA content goes to end-users to avoid non-compliance. Herein, the server 102 provides real-time production validation as part of current ADA operations. The server 102 may be configured to decouple ADA content generation operations into micro-services and generates and validates ADA content on-demand prior to presenting the ADA content to one or more peripherals of the server 102 and/or thew network devices 108. The server 102 may control some, or all, operations in ADA content generation life cycle.

Machine Learning Training Sample Generation Using Generative Adversarial Networks FIG. 2 shows an operational flow 200 in which the system 100 of FIG. 1 is configured to perform one or more of the training operations 133. The operational flow 200 may comprise an application stack 202 and an ADA content stack 204. In FIG. 2, the operational flow 200 comprises multiple operations 208-260. The operations 208-260 may be performed between the server 102 and one or more network devices 108 hosting one or more of the local services 192. The training operations 133 may be performed by the server 102 and/or at least network device 108 communicatively coupled to one another in a communication network via one or more connections.

In one or more embodiments, the operational flow 200 comprises dynamically generating training samples used to train a machine learning algorithm 160 configured to improve ADA operation compliance. In particular, the operational flow 200 may be implemented (e.g., performed) by the system 100 configured to create ADA content accurate training samples from an existing application stack 202 that the machine learning algorithm 160 uses to determine whether images and/or text of documents are ADA compliant in real-time. The training samples may be images and/or text of documents comprising readable portions (e.g., words) that an ADA engine (e.g., executed as one or more of the instructions 132) may analyze to create sound data that "reads" the readable portions via one or more of the server peripherals 124 and/or one or more of the device peripherals 182. In the operational flow 200, the system 100 may be configured to use multiple generative adversarial networks (GAN) to create ADA content accurate training samples by applying ADA reading features onto multiple real samples 147 generated from one or more of the services 166. The operational flow 200 may comprise generating the real samples 147 from an existing application stack 202. The real samples 147 may be images and/or text of documents that a service 166 is configured to generate and/or modify. Then, via the GAN, the operational flow 200 may comprise iteratively evaluating each of the real samples 147 against possible modifications 145 that may change readable elements in the documents. At this stage, the system 100 may be configured to determine whether the content of the real samples 147 is readable after the possible modifications 145 are applied. A training sample may be generated each time if the system 100 determines that the real samples 147 are readable after the possible modifications 145 are applied.

The application stack 202 may be a set of applications, services 166, and/or documents configured to perform and/or be triggered by one or more commands, configurations and/or processes. The application stack 202 may be a collection of reference documents comprising one or more specific aspects. For example, the application stack 202 may comprise guideline documents comprising guidelines associated with the appearance of images and/or data accepted in a communication network, regulation documents referencing rules and procedures to access data in the communication network, and/or design documents comprising documents representative of an expected appearance of image data and/or text data.

The ADA content stack 204 may be a set of applications, services 166, and/or documents configured to perform and/or be triggered by one or more commands, configurations and/or processes. The ADA content stack 204 may be a collection of reference documents comprising one or more specific aspects of ADA compliance. For example, the ADA content stack 204 may comprise ADA documents comprising examples of text data and/or image data and any associated ADA content generated from these data types.

The classification network 206 may comprise one or more classifiers 164 configured to filter and/or modify information. In some embodiments, the classification network 206 may be configured to distinguish between real data and generated data. The classification network 206 may be configured to assess an authenticity of data evaluated over time.

In the operational flow 200 of FIG. 2, at operation 208, the server 102 may be configured to generate one or more real samples 147 based at least in part upon data and/or documents obtained from the application stack 202. At operation 210, the server 102 may be configured to determine one or more requirement documents from the application stack 202. The requirement documents may be one or more regulation documents configured to provide one or more guidelines for document tags 150. At operation 212, the server 102 may be configured to determine one or more design documents configured to inform aspects of the appearance of source text and/or images. At operation 214, the server 102 may be configured to determine one or more annotations 144 corresponding to known image data and/or text data for documents. At operation 216, the server 102 may be configured to check an ADA content repository from which possible sources of ADA content may be obtained. Herein, the server 102 may be configured to modify the sources of ADA content in accordance with a tolerated change defined by the annotations 144. At operation 218, the server 102 may be configured to modify the sources of ADA content based on one or more end-to-end (E2E) scenarios 149. Herein, the server 102 may be configured to modify the sources of ADA content in accordance with a tolerated change defined by the annotations 144 and/or the end-to-end (E2E) scenarios 149. At operation 220, the server 102 may be configured to generate one or more of the real samples 147 based on a modified version of the sources of the ADA content. The real samples 147 may be based on one or more requirement documents and/or design documents from the application stack 202. The real samples 147 may be a version of one or more requirement documents and/or design documents from the application stack 202 after these documents are modified within the allowance of one or more annotations 144, to match possible ADA content, and/or to resemble processing as performed in an end-to-end scenario 149.

In the operational flow 200 of FIG. 2, at operation 230, the server 102 may be configured to generate one or more adversarial network samples 148 based at least in part upon data and/or documents obtained from the ADA content stack 204. At operation 231, the server 102 may pick a training sample from the ADA content stack 204. At this stage, the server 102 is configured to generate a random input vector based on the training sample from the ADA content stack 204. At operation 232, the server 102 may establish one or more E2E scenarios 149 that may provide one or more possible changes to the input vector. At operation 234, the server 102 may be configured to modify the input vector in accordance with the E2E scenario 149. At operation 236, the server 102 may be configured to generate one or more adversarial network samples 148 based on the modified versions of the input vector.

In one or more embodiments, at operation 240, the classification network 206 may be configured to filter, discern, and/or separate real ADA content from fake ADA content. The classification network 206 may be configured to receive the real samples 147 and the adversarial network samples 148 as inputs and train the machine learning algorithm 160 to determine whether ADA content. At operation 250, the server 102 may be configured to determine whether the ADA content is accurate b comparing a real sample 147 with a similar adversarial network sample 148. If the server 102 determines that the adversarial network sample 148 does not at least partially match the real sample 147 (e.g., NO), the operational flow 200 continues to the operation 234, where the server 102 is configured to fine tune and/or regenerate the adversarial network sample using a different E2E scenario 149. If the server 102 determines that the adversarial network sample 148 at least partially matches the real sample 147 (e.g., YES), the operational flow 200 continues to operation 260. At operation 260, the server 102 may be configured to determine whether the ADA content stack 204 comprises one or more additional training samples. If the server 102 determines that the ADA content stack 204 does not comprise one or more additional training samples (e.g., NO), the operational flow 200 continues to the ADA content stack 204 to pick a new/next training sample. If the server 102 determines that the ADA content stack 204 comprises one or more additional training samples (e.g., YES), the operational flow 200 concludes by moving all trained models 161 to be used in generating ADA content from received information.

Example Process to Generate Machine Learning Training Samples Using Generative Adversarial Networks FIG. 3 illustrates an example flowchart of a process 300 configured to perform one or more of the training operations 133 in the operational flow 200 of FIG. 2. Modifications, additions, or omissions may be made to the process 300. The process 300 may comprise more, fewer, or other operations than those shown in FIG. 3. For example, operations may be performed in parallel or in any suitable order. While at times discussed as the server 102, the network devices 108, or components of any of thereof performing operations described in operations 302-334 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 302-334.

The process 300 starts at operation 302, where the server 102 is configured to receive a reference file 139 from the reference repository 138. The reference file 139 may comprise one or more reference portions 140. The reference files 139 in the reference repository 138 may be representative of one or more outputs of a service stack (e.g., the application stack 202 described in reference to FIG. 2). At operation 304, the server 102 is configured to determine an annotation 144 for the reference file 139. The annotation 144 may comprise at least one tolerated change to a specific reference portion 140 of the multiple reference portions 140 in the reference file 139. At operation 306, the server 102 is configured to generate a real sample 147 based on the reference portion 140 and the annotation 144. The real sample 147 may comprise a modified version of the reference portion 140 within the annotation 144. At operation 308, the server 102 is configured to receive a training file 142 from a training repository 141. The training file 142 may comprise multiple randomized portions 143 generated to mimic and/or represent real data samples. The training files 142 may be representative of outputs in a modification information stack (e.g., the ADA content stack 204 described in reference to FIG. 2). At operation 310, the server 102 is configured to obtain evaluation commands configured to incorporate one or more randomized changes onto the training file 142. At operation 312, the server 102 is configured to generate an adversarial network sample 148 based on the training file 142 and the evaluation commands. The adversarial network sample 148 may comprise a randomized portion 143 of the training file 142. At operation 314, the server 102 is configured to execute an ML algorithm 160 to determine whether the adversarial network sample 148 at least partially matches the real sample 147. The machine learning algorithm 160 may be configured to evaluate data in accordance with one or more machine learning models 161. The ML algorithm 160 may, when executed, be configured to evaluate data in accordance with one or more ML models 161 to perform the one or more operations discussed in reference to FIG. 1.

At operation 320, the server 102 is configured to determine whether the samples at least partially match one another. If the server 102 determines that the adversarial network sample 148 does not at least partially match the real sample 147 (e.g., NO), the process 300 proceeds to operation 322. At operation 322, where the server 102 is configured to determine that the real samples 147 are basis for negative training. In response to determining that the adversarial network sample 148 at least partially matches the real sample 147, the server 102 may be configured to train the one or more machine learning models 161 using the real sample 147 and the adversarial network sample 148. If the server 102 determines that the adversarial network sample 148 at least partially matches the real sample 147 (e.g., YES), the process 300 proceeds to operation 332. At operation 332, the server 102 is configured to determine that the real samples 147 are basis for positive training. In response to determining that the adversarial network sample 148 at least partially matches the real sample 147, the server 102 may be configured to train the one or more machine learning models 161 using the real sample 147 and the adversarial network sample 148.

The process 300 may end at operation 334, where the server 102 may be configured to train one or more machine learning models 161 using the real sample 147 and the adversarial network sample 148. In response to determining that the adversarial network sample 148 at least partially matches the real sample 147, the server 102 is configured to train the one or more machine learning models 161 using the real sample 147 and the adversarial network sample 148.

In some embodiments, the server 102 may be configured to modify the real sample 147 in accordance with an end-to-end scenario 149 prior to proceeding to the classifier 164. The adversarial network sample 148 may be modified in accordance with an end-to-end scenario 149 prior to proceeding to the classifier 164. In some embodiments, the ADA content may be determined to be accurate after performing one or more iterations of analysis and evaluating the generated ADA content against a source. The server 102 may be configured to evaluate and/or check to determine whether one or more randomized samples were used for training. The files may be image files and the portions may be pixels. The reference file 139 may comprise an image and, each of the reference portions 140, may be a group of pixels in the image.

Attribute Recharacterization in Individual Portions of Images

FIG. 4 shows an operational flow 400 in which the system 100 of FIG. 1 is configured to perform one or more of the generation operations 134. The operational flow 400 may comprise an API gateway 402. In FIG. 4, the operational flow 400 comprises multiple operations 410-438. The operational flow 400 may be performed between the server 102 and one or more network devices 108 hosting one or more of the local services 192. The generation operations 134 may be performed by the server 102 and/or at least network device 108 communicatively coupled to one another in a communication network via one or more connections.

In one or more embodiments, the operational flow 400 comprises using generative artificial intelligence and an API gateway 402 to validate requests 165 for ADA content. In particular, ADA content may refer to audio generated based on readable elements in an image and/or a text of a document. In some embodiments, the system 100 may be configured to collect information and/or data from an interface (e.g., a screen, sensors, and the like) and generate a request for ADA content based on patterns associated with a user 114 and one or more application-specific operations. As the request 165 is generated, the request 165 is evaluated against possible changes that the user 114 is expected to make and/or makes in the interface within the boundaries of the application. The system 100 may be configured to determine whether the changes within the application are acceptable. If the changes are acceptable, the system 100 may be configured to generate ADA content and ADA content accurate responses comprising sound data "reading" readable elements from the interface.

The API gateway 402 may be a network node configured to connect the networks 110 with the system 100 and/or any two networks with same or different transmission protocols together. The API gateway 402 may be a piece of networking hardware, and/or software executed by hardware, that allows data to flow from one discrete network to another. The API gateway 402 may provide access to one or more specific APIs associated with one or more services 166 in the system 100.

In the operational flow 400 of FIG. 4, at operation 410, the server 102 may be configured to handle one or more peripheral operations in which interfaces are used to collect one or more operation information associated with the network devices 108. At operation 412, the server 102 may be configured to collect and/or receive information from one or more interfaces. In the example of FIG. 4, the server 102 may be configured to collect user interface (UI) data such as images and/or text displayed in a visual interface. The collected information may be referred to as peripheral information 151. At operation 414, the server 102 may be configured to perform one or more validation operations 136 to determine whether the peripheral information 151 is accurately retrieved from a source that may be modified to generate ADA content. At operation 416, the server 102 may be configured to verify ADA correlation 152 between the peripheral information 151 and one or more tags 150. The correlation 152 may reference an amount of information preserved and/or expected to be preserved in communication information 153 comprising ADA content that matches the peripheral information 151 after the communication information 153 is generated based on the peripheral information 151. At operation 420, the server 102 is configured to determine whether there is a correlation 152 missing between the peripheral information 151 and one or more tags 150. If the server 102 determines that there is at least one correlation 152 missing between the peripheral information 151 and one or more tags 150 (e.g., YES), the operational flow 400 proceeds to operation 422. If the server 102 determines that there are no correlations 152 missing between the peripheral information 151 and one or more tags 150 (e.g., NO), the operational flow 400 proceeds to operation 432.

At operation 422, the server 102 is configured to process the peripheral information 151 and the one or more tags 150 using one or more GAN models 161. At operation 424, the server 102 may be configured to analyze the peripheral information 151 to identify missing data. At operation 426, the server 102 may be configured to impute ADA content into the peripheral information 151. The server 102 is configured to determine whether additional tags 150 are added to facilitate generation of the ADA content. At operation 428, the server 102 is configured to generate one or more flags indicating changes to the tags 150. At operation 430, the server 102 is configured to determine whether there is a correlation 152 missing between the peripheral information 151 and an updated version of the one or more tags 150. If the server 102 determines that there is at least one correlation 152 missing between the peripheral information 151 and the updated version of one or more tags 150 (e.g., YES), the operational flow 400 proceeds to operation 422. If the server 102 determines that there are no correlations 152 missing between the peripheral information 151 and the updated version of the one or more tags 150 (e.g., NO), the operational flow 400 proceeds to operation 432.

In one or more embodiments, at operation 432, the server 102 may be configured to authorize ADA content generated and/or to be generated based on the peripheral information 151. At operation 434, the API gateway 402 may be configured to generate the ADA content. At operation 436, the server 102 may be configured to generate a voice response comprising the ADA content. At operation 438, the server 102 may be configured to present the ADA content in one or more peripherals and/or interfaces.

Example Process to Recharacterize Attributes in Individual Portions of Images

FIG. 5 illustrates an example flowchart of a process 500 configured to perform one or more of the generation operations 134 in the operational flow 400 of FIG. 4. Modifications, additions, or omissions may be made to the process 500. The process 500 may comprise more, fewer, or other operations than those shown in FIG. 5. For example, operations may be performed in parallel or in any suitable order. While at times discussed as the server 102, the network devices 108, or components of any of thereof performing operations described in operations 502-530 in the process 500, any suitable system or components of the system 100 may perform one or more operations of the process 500. For example, one or more operations of the process 500 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 502-530.

The process 500 starts at operation 502, where the server 102 is configured to receive peripheral information 151 from a network device 108. The peripheral information 151 may comprise a first format 157. At operation 504, the server 102 is configured to generate a tag 150 for a portion of the peripheral information 151. The tag 150 may comprise guidance to generate communication information 153 that correlates to the peripheral information 151. The communication information 153 may comprise a second format 157. At operation 506, the server 102 is configured to determine a correlation 152 between the peripheral information 151 and the tag 150. The correlation 152 may be configured to reference an amount of information preserved in the communication information 153 that matches the peripheral information 151 after the communication information 153 is generated based on the peripheral information 151. At operation 508, the server 102 is configured to determine whether an amount of information preserved during a generation of communication information 153 based on the peripheral information 151 is outside an accuracy tolerance 146.

At operation 510, the server 102 is configured to determine whether the information change is outside the accuracy tolerance 146. If the server 102 determines that the information change is not outside the accuracy tolerance 146 (e.g., NO), the process 500 proceeds to operation 512. At operation 512, where the server 102 is configured to generate a portion of the communication information 153 based on the portion of the peripheral information 151 in accordance with the tag 150. If the server 102 determines that the information change is outside the accuracy tolerance 146 (e.g., YES), the process 300 proceeds to operation 332. At operation 522, the server 102 may be configured to determine that the samples are basis for positive training. In response to determining that the amount of information preserved is outside the accuracy tolerance 146, execute the machine learning algorithm 160 to determine at least one difference between the peripheral information 151 and the communication information 153. The machine learning algorithm 160 may be configured to evaluate data in accordance with one or more machine learning models 161. The ML algorithm 160 may, when executed, be configured to evaluate data in accordance with one or more ML models 161 to perform the one or more operations discussed in reference to FIG. 1.

In one or more embodiments, the process 500 continues at operation 524 where the server 102 is configured to evaluate the at least one difference against historical data 154 associated with the network device 108. The historical data 154 may comprise patterns associated with one or more previous communication information 153 generated from previous peripheral information 151 received from the network device 108. At operation 526, the server 102 may be configured to determine multiple tagging commands 155 based on an evaluation of the at least one difference against the historical data 154. The tagging commands 155 may comprise the possible modifications 145 to the tag 150. The server 102 may be configured to modify the tag 150 to incorporate the possible modifications 145. At operation 528, the server 102 may be configured to generate a portion of the communication information 153 based on the portion of the peripheral information 151 in accordance with a modified version of the tag 150.

The process 500 may end at operation 530, where the server 102 may be configured to train one or more machine learning models 161 using the real sample 147 and the adversarial network sample 148. The server 102 may be configured to transmit the portion of the communication information 153 to the network device 108.

In some embodiments, the server 102 may be configured to evaluate one or more correlations 152 over time. The server 102 may be configured to train the one or more machine learning models 161 using the tag 150 and the tagging commands 155. The data may be collected from a peripheral after a user 114 interacts with a given server peripheral 124 and/or one or more device peripherals 182. The peripheral information 151 may be associated with a peripheral of the network device 108. The peripheral information 151 may be collected after a user interacts with the peripheral of the network device 108. The first format may comprise image data and second format may comprise audio data. The first format 157 of the peripheral information 151 may comprise an image format and the second format 157 of the communication information 153 comprises a sound format. The models 161 may comprise a GAN model.

Node Generation in Network Graphs Based on Characterization Attributes in Portions of Images FIG. 6 shows an operational flow 600 in which the system 100 of FIG. 1 is configured to perform one or more of the analysis operations 135. The operational flow 600 may comprise an application stack 602. In FIG. 6, the operational flow 600 comprises multiple operations 610-654. The operational flow 600 may be performed between the server 102 and one or more network devices 108 hosting one or more of the local services 192. The analysis operations 135 may be performed by the server 102 and/or at least network device 108 communicatively coupled to one another in a communication network via one or more connections.

In one or more embodiments, the operational flow 600 comprises dynamically generating training intelligent network graphs 170 using validated ADA content. In particular, the operational flow 200 may comprise gathering requirement documents and design documents of applications comprising ADA content, collecting annotated code and corresponding ADA content for each end-to-end flow in the application associated to unique user transactions, building an ADA content repository with ADA scenarios mapped to all possible user transactions, labeling accuracy of each data flow, and deriving network nodes from the labeled data. Further, the system 100 is configured to establish node connections between the derived network nodes to build a network graph 170, generate one or more relation paths 172 for each labeled transaction in each data flow, and generate ADA content and validate corresponding content accuracy against the labeled data. The system 100 may be configured to perform the aforementioned operations iteratively until an accuracy threshold is met for each portion of the ADA content. Here, the network graphs are saved to in a network model 156 to be used to evaluate tags in ADA content.

The application stack 602 may be a set of applications, services 166, and/or documents configured to perform and/or be triggered by one or more commands, configurations and/or processes. The application stack 602 may be a collection of reference documents comprising one or more specific aspects. For example, the application stack 602 may comprise guideline documents comprising guidelines associated with the appearance of images and/or data accepted in a communication network, regulation documents referencing rules and procedures to access data in the communication network, and/or design documents comprising documents representative of an expected appearance of image data and/or text data.

In the operational flow 600 of FIG. 6, at operation 610, the server 102 may be configured to receive requirement documents from the application stack 602. At operation 612, the server 102 may be configured to receive one or more design documents from the application stack 602. At operation 614, the server 102 may be configured to receive document annotation 144 that may be associated with one or more peripheral information 151. At operation 616, the server 102 may be configured to analyze in one or more entities 159 in data within the peripheral information 151. At operation 618, the server 102 is configured to establish one or more nodes 171 representative of each of the nodes 171. At operation 620, the server 102 may be configured to generate one or more node connections (e.g., one or more relation paths 172). At operation 622, the server 102 may be configured to build one or more network graphs 170 based on the nodes 171 and the relation paths 172. At operation 624, the server 102 may be configured to cluster nodes 171 to create one or more network graphs 170. At operation 626, the server 102 may be configured to generate ADA content representative of at least one of the network graphs 170.

In one or more embodiments, at operation 614, the server 102 may be configured to receive document annotation 144 that may be associated with one or more peripheral information 151. At operation 632, the server 102 may be configured to sample an ADA content repository to identify examples of ADA content. At operation 634, the server 102 may be configured to determine one or more labels 158 associated with the example of ADA content. At operation 636, the server 102 may be configured to train binary selection of an ADA accuracy classifier 164. At operation 640, the server 102 is configured to determine whether the generated ADA content from the operation 626 meets labeling accuracy from the operation 634. If the server 102 determines that an amount of information referenced by the labels 158 is not within an accuracy tolerance 146 (e.g., NO), the operational flow 600 proceeds to operation 616. If the server 102 determines that an amount of information referenced by the labels 158 is within an accuracy tolerance 146 (e.g., YES), the operational flow 600 proceeds to operation 650. At operation 650, the server 102 may be configured to determine whether the training of the network graph 170 is completed. If the server 102 determines that the training of the network graph 170 is not completed (e.g., NO), the operational flow 600 proceeds to operation 652. If the server 102 determines that the training of the network graph 170 is completed (e.g., YES), the operational flow 600 returns to operation 626.

In one or more embodiments, at operation 652, the server 102 is configured to serialize the network graphs 170 into one or more models 161 and/or network models 156. At operation 654, the server 102 may be configured to expose the models 161 and/or the network models 156 to one or more of the services 166.

Example Process to Generate One or More Nodes in Network Graphs Based on Characterization Attributes in Portions of Images FIG. 7 illustrates an example flowchart of a process 700 to perform one or more of the analysis operations 135 in the operational flow 600 of FIG. 6. Modifications, additions, or omissions may be made to the process 700. The process 700 may comprise more, fewer, or other operations than those shown in FIG. 7. For example, operations may be performed in parallel or in any suitable order. While at times discussed as the server 102, the network devices 108, or components of any of thereof performing operations described in operations 702-744 in the process 700, any suitable system or components of the system 100 may perform one or more operations of the process 700. For example, one or more operations of the process 700 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 702-744.

The process 700 starts at operation 702, where the server 102 is configured to receive reference information from the reference repository 138. The reference repository 138 may comprise multiple reference information. The reference information may be one or more of the reference files 139. At operation 704, the server 102 is configured to determine an annotation 144 for the reference information. The annotation 144 may comprise a tolerated change to the reference information. At operation 706, the server 102 is configured to generate first communication information 153 based on the reference information and the annotation 144. The first communication information 153 may preserve a first amount of information that matches the reference information. At operation 708, the server 102 is configured to generate a first label 158 referencing a first amount of information in the first communication information 153. At operation 710, the server 102 is configured to execute a machine learning algorithm 160 to determine whether the first amount of information referenced by the first label 158 is within an accuracy tolerance 146. The machine learning algorithm 160 may be configured to evaluate data in accordance with one or more machine learning models 161. The ML algorithm 160 may, when executed, be configured to evaluate data in accordance with one or more ML models 161 to perform the one or more operations discussed in reference to FIG. 1.

At operation 720, the server 102 is configured to determine whether the samples at least partially match one another. If the server 102 determines that the first amount of information referenced by the first label 158 is not within the accuracy tolerance 146 (e.g., NO), the process 700 proceeds to operation 732. At operation 732, where the server 102 is configured to determine multiple entities 159 based on the reference information and the annotation 144. In response to determining that the first amount of information is not within the accuracy tolerance 146, the server 102 is configured to determine one or more entities 159 based on the reference information and the annotation 144. If the server 102 determines that the amount of information referenced by the first label 158 is within an accuracy tolerance 146 (e.g., YES), the process 300 proceeds to operation 722. The process 700 may end at operation 722, where the server 102 is configured to train one or more machine learning models 161 using the reference information, the first communication information 153, and the first label 158.

In one or more embodiments, the process 700 continues at operation 734, the server 102 is configured to establish one or more network nodes 171 for the entities 159. Each of the nodes 171 may correspond to one of the entities 159. At operation 736, the server 102 is configured to build a network graph 170 comprising the network nodes 171. The network graph 170 may comprise one or more relation paths 172 among the nodes 171. At operation 740, the server 102 is configured to generate second communication information 153 based on the network graph 170. At operation 742, the server 102 is configured to generate a second label 158 referencing a second amount of information in the second communication information 153.

The process 700 may end at operation 744, where the server 102 may be configured to train one or more machine learning models 161 using the reference information, the second communication information 153, and the second label 158.

In some embodiments, the reference files 139 are used to generate training networks. The server 102 may be configured to evaluate accuracy of content generated for the training graphs. The server 102 may be configured to create a repository of ADA content. The server 102 may be configured to train an accuracy classifier 164 configured to index the reference information in association with the first communication information 153 as being generated in accordance with the label 158. The peripheral information 151 may be image data and the communication information 153 is sound data.

On-Demand Node Annotation in Network Graphs

FIG. 8 shows an operational flow 800 in which the system 100 of FIG. 1 is configured to perform one or more of the generation operations 134. The operational flow 800 may comprise one or more network graphs 170. In FIG. 8, the operational flow 800 comprises multiple operations 810-858. The operational flow 800 may be performed between the server 102 and one or more network devices 108 hosting one or more of the local services 192. The generation operations 134 may be performed by the server 102 and/or at least network device 108 communicatively coupled to one another in a communication network via one or more connections.

In one or more embodiments, the operational flow 800 comprises modifying ADA content in real time. In particular, the operational flow 200 may comprise executing a machine learning algorithm 160 to determine whether clustered readable elements identified in images and/or text of documents are complete. Once the system 100 determines that the readable elements are complete, the system 100 may be configured to generate ADA content based on the readable elements. Herein, the system 100 is configured to read inputs from an interface and verify whether the inputs comprise readable elements. Upon determining that the inputs comprise readable content, the system 100 is configured to cluster the readable elements and evaluate whether information provided in the readable elements is complete by evaluating each cluster of readable elements against one or more intelligent network graphs 170. At this stage, the machine learning algorithm 160 may be executed to determine missing readable elements missing in a specific cluster of readable elements. As the missing readable elements are determined, the system 100 may be configured to validate, select, and add the missing readable elements to specific clusters. In turn, these clusters may be used as a basis to generate modified ADA content.

In the operational flow 800 of FIG. 8, at operation 810, the server 102 may be configured to handle one or more peripheral operations in which interfaces are used to collect one or more operation information associated with the network devices 108. At operation 812, the server 102 may be configured to collect and/or receive information from one or more interfaces. In the example of FIG. 8, the server 102 may be configured to collect user interface (UI) data such as images and/or text displayed in a visual interface. The collected information may be referred to as peripheral information 151. At operation 814, the server 102 may be configured to perform one or more validation operations 136 to determine whether the peripheral information 151 is accurately retrieved from a source that may be modified to generate ADA content. At operation 816, the server 102 may be configured to verify ADA correlation 152 between the peripheral information 151 and one or more tags 150. The correlation 152 may reference an amount of information preserved and/or expected to be preserved in communication information 153 comprising ADA content that matches the peripheral information 151 after the communication information 153 is generated based on the peripheral information 151.

In one or more embodiments, at operation 820, the server 102 is configured to determine whether there is a correlation 152 missing between the peripheral information 151 and one or more tags 150. If the server 102 determines that there is at least one correlation 152 missing between the peripheral information 151 and one or more tags 150 (e.g., YES), the operational flow 800 proceeds to operation 830. If the server 102 determines that there are no correlations 152 missing between the peripheral information 151 and one or more tags 150 (e.g., NO), the operational flow 800 proceeds to operation 856. At operation 830, the server 102 is configured to determine whether there is an annotation 144 missing between the peripheral information 151 and one or more tags 150. If the server 102 determines that there is at least one annotation 144 missing between the peripheral information 151 and one or more tags 150 (e.g., YES), the operational flow 800 proceeds to operation 842. If the server 102 determines that there are no annotations 144 missing between the peripheral information 151 and one or more tags 150 (e.g., NO), the operational flow 800 proceeds to operation 832. At operation 832, the server 102 is configured to invoke one or more alternative solutions to provide the missing annotations 144.

In one or more embodiments, at operation 842, the server 102 is configured to analyze clusters of information using one or more of the network graphs 170 that are generated and/or updated in accordance with operation 844. At operation 844, the server 102 may be configured to generate one or more of the network graphs 170. At operation 846, the server 102 may be configured to impute missing nodes 171 in the clusters of data. At operation 848, the server 102 may be configured to merge code by combining imputed code and one or more existing network graphs 170.

In one or more embodiments, at operation 850, the server 102 may be configured to generate a request payload with the objective of creating ADA content based on one or more annotated network graphs 170. At operation 852, the server 102 may be configured to make an ADA request 165. At operation 854, the server 102 may be configured to receive an ADA response comprising ADA content. At operation 856, the server 102 may be configured to generate a voice response comprising the ADA content. At operation 858, the server 102 may be configured to present the ADA content in one or more peripherals and/or interfaces.

Example Process to Annotate Nodes in Network Graphs on Demand

FIG. 9 illustrates an example flowchart of a process 900 to perform one or more of the generation operations 134 in the operational flow 800 of FIG. 8. Modifications, additions, or omissions may be made to the process 900. The process 900 may comprise more, fewer, or other operations than those shown in FIG. 9. For example, operations may be performed in parallel or in any suitable order. While at times discussed as the server 102, the network devices 108, or components of any of thereof performing operations described in operations 902-934 in the process 900, any suitable system or components of the system 100 may perform one or more operations of the process 900. For example, one or more operations of the process 900 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 902-934.

The process 900 starts at operation 902, where the server 102 is configured to receive peripheral information 151 from a network device 108. The peripheral information 151 may comprise a first format 157. At operation 904, the server 102 is configured to generate multiple annotations 144 for a portion of the peripheral information 151. The annotations 144 may comprise guidance to generate communication information 153 that correlates to the peripheral information 151 and the communication information 153 comprises a second format 157. At operation 906, the server 102 is configured to determine a correlation 152 between the peripheral information 151 and the annotations 144. The correlation 152 may reference an amount of information preserved in the communication information 153 that matches the peripheral information 151 after the communication information 153 is generated based on the peripheral information 151. At operation 908, the server 102 is configured to determine whether an amount of information preserved after generating communication information 153 based on the peripheral information 151 is outside an accuracy tolerance 146.

At operation 910, the server 102 is configured to determine whether the information change is outside a specific tolerance. If the server 102 determines that the information change is not outside a specific tolerance 146 (e.g., NO), the process 900 proceeds to operation 922. At operation 922, where the server 102 is configured to determine at least one difference between the peripheral information 151 and the communication information 153. If the server 102 determines that information change is outside a specific tolerance 146 (e.g., YES), the process 900 proceeds to operation 912. At operation 912, the server 102 is configured to generate a portion of the communication information 153 based on the portion of the peripheral information 151 in accordance with the annotation 144.

In one or more embodiments, the process 900 continues at operation 924, the server 102 is configured to evaluate the at least one difference against a network graph 170. The at least one network graph 170 may comprise one or more nodes 171 trained to reference one or more knowledge domains and one or more relation paths 172 between the one or more nodes 171. The server 102 may be configured to evaluate the at least one difference against the at least one network graph 170. An evaluation may comprise determining a network graph 170 of based on the peripheral information 151, the network graph 170 may comprise one or more nodes 171 generated based on patterns associated with one or more previous communication information 153 generated from previous peripheral information 151 received from the network device 108 and predicts one or more specific nodes 171 to be added to the network graph 170 to incorporate the at least one difference. At operation 926, the server 102 is configured to determine multiple missing nodes 171 based on an evaluation of the at least one difference against the network graph 170. The server 102 may be configured to determine one or more missing nodes 171 based on the evaluation of the at least one difference against the at least one network graph 170. The missing nodes 171 may comprise one or more possible modifications 145 to the annotations 144. The missing nodes 171 may be one or more specific nodes 171 to be added to the network graph 170 to incorporate the at least one difference. At operation 928, the server 102 is configured to determine one or more possible modifications 145 based on the missing nodes 171. At operation 930, the server 102 is configured to modify the annotations 144 to incorporate the possible modifications 145. At operation 932, the server 102 is configured to generate a portion of the communication information 153 based on the portion of the peripheral information 151 in accordance with a modified version of the annotations 144.

The process 900 may end at operation 934, where the server 102 may be configured to transmit the portion of the communication information to the network device 108. In some embodiments, the first format comprises image data and second format comprises audio data.

Query Analysis Using Machine Learning-Driven APIs

FIG. 10 shows an operational flow 1000 in which the system 100 of FIG. 1 is configured to perform one or more of the validation operations 136. The operational flow 1000 may comprise an API gateway 1002. In FIG. 10, the operational flow 1000 comprises multiple operations 1008-1036. The operational flow 1000 may be performed between the server 102 and one or more network devices 108 hosting one or more of the local services 192. The validation operations 136 may be performed by the server 102 and/or at least network device 108 communicatively coupled to one another in a communication network via one or more connections.

In one or more embodiments, the operational flow 1000 covers evaluating ADA content in real time. In particular, the operational flow 1000 may comprise executing a machine learning algorithm 160 to determine whether ADA responses (e.g., basis for ADA content such as reference sounds, voices, and the like) are accurate within the usage patterns associated with a user 114. Once the system 100 determines that the ADA responses are accurate within a threshold (e.g., tolerances 146), the system 100 generates ADA content for the user based on the ADA response. Here, the system 100 may be configured to read inputs from an interface, assign relevance of readable elements received and/or exchanged by the interface, and determine one or more readable elements in the interface that the user 114 is expected to understand. In this context, the system 100 is configured to determine whether rules and policies 168 enable ADA content associated with the one or more readable elements. In some embodiments, the system 100 determines whether ADA content may be generated from the readable elements prioritized by the user 114. If the ADA content is not generated from the readable elements, the system 100 may be configured to use the machine learning algorithm 160 to separate and organize the readable elements until ADA content is generated.

The API gateway 1002 may be a network node configured to connect the networks 110 with the system 100 and/or any two networks with same or different transmission protocols together. The API gateway 1002 may be a piece of networking hardware, and/or software executed by hardware, that allows data to flow from one discrete network to another. The API gateway 1002 may provide access to one or more specific APIs associated with one or more services 166 in the system 100.

In the operational flow 1000 of FIG. 10, at operation 1010, the server 102 may be configured to handle one or more peripheral operations in which interfaces are used to collect one or more operation information associated with the network devices 108. At operation 1012, the server 102 may be configured to collect and/or receive information from one or more interfaces. In the example of FIG. 10, the server 102 may be configured to collect user interface (UI) data such as images and/or text displayed in a visual interface. The collected information may be referred to as peripheral information 151. At operation 1014, the server 102 is configured to generate a request payload to obtain ADA content from the peripheral information 151. At operation 1016, the server 102 may be configured to provide some annotated data to contribute to the request for ADA content. At operation 1018, the server 102 is configured to interact with the API gateway 1002 to control one or more of the verification operations 136.

In one or more embodiments, at operation 1020, the server 102 and/or the API gateway 1002 may be configured to provide validate the payload request 165. The requests 165 may be validated if the request comprises documents and/or images that are determined to be suitable to generate corresponding ADA content. If the server 102 determines that the request 165 is not valid (e.g., NO), the operational flow 1000 returns to operation 1018 to report one or more error responses. If the server 102 determines that the request 165 is valid (e.g., YES), the operational flow 1000 proceeds to operation 1022. At operation 1022, the server 102 and/or the API gateway 1002 is configured to generate ADA content. The ADA content may be generated using one or more of the machine learning algorithms 160 described above. At operation 1024, the server and/or the API gateway 1002 may be configured to generate an ADA response comprising the ADA content.

In one or more embodiments, at operation 1030, the server 102 is configured to determine whether the ADA API response comprises one or more errors. If the server 102 determines that the ADA API response does not comprise one or more errors (e.g., NO, received from the operation 1024), the operational flow 1000 returns to operation 1012.

If the server 102 determines that the ADA API response comprises one or more errors (e.g., YES, received from the operation 1020), the operational flow 1000 proceeds to operation 1032. At operation 1032, the server 102 may be configured to verify ADA correlation 152 between the peripheral information 151 and one or more tags 150. The correlation 152 may reference an amount of information preserved and/or expected to be preserved in communication information 153 comprising ADA content that matches the peripheral information 151 after the communication information 153 is generated based on the peripheral information 151. At operation 1034, the server 102 may be configured to generate a voice response comprising the ADA content. At operation 1036, the server 102 may be configured to present the ADA content in one or more peripherals and/or interfaces.

Example Process to Analyze Queries Using Machine Learning-Driven APIs

FIG. 11 illustrates an example flowchart of a process 1100 to perform one or more of the validation operations 136 in the operational flow 1000 of FIG. 10. Modifications, additions, or omissions may be made to the process 1100. The process 11100 may comprise more, fewer, or other operations than those shown in FIG. 11. For example, operations may be performed in parallel or in any suitable order. While at times discussed as the server 102, the network devices 108, or components of any of thereof performing operations described in operations 1102-1136 in the process 1100, any suitable system or components of the system 100 may perform one or more operations of the process 1100. For example, one or more operations of the process 1100 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 1102-1136.

The process 1100 starts at operation 1102, where the server 102 is configured to receive peripheral information 151 from a network device 108. The peripheral information 151 may comprise a first format. At operation 1104, the server 102 is configured to determine an annotation 144 for the peripheral information 151. The annotation 144 may reference a tolerated change to the first peripheral information 151. At operation 1106, the server 102 is configured to generate a request 165 to generate communication information 153 based on the peripheral information 151. The communication information 153 may comprise a second format. The request 165 may be based on the peripheral information 151 and the annotation 144 and reference a modification 145 of the peripheral information 151. At operation 1108, the server 102 is configured to determine a service interface (API) in accordance with the modification 145. At operation 1110, the server 102 is configured to determine, via the service interface, whether the modification 145 is within a tolerated change referenced by the annotation 144.

At operation 1120, the server 102 is configured to determine whether a proposed change is within a tolerated change. If the server 102 determines that the modification 145 is not within a tolerated change (e.g., NO), the process 1100 proceeds to operation 1122. At operation 1122, where the server 102 is configured to generate a report 167 referencing that the communication information 153 is allowed. In response to determining that the modification 145 is not within the tolerated change referenced by the annotation 144, the server 102 is configured to generate an error communication report (e.g., a report 167) referencing that the communication information 153 is not generated. If the server 102 determines that the modification 145 is within a tolerated change (e.g., YES), the process 1100 proceeds to operation 1132. At operation 1132, the server 102 is configured to generate a report 167 referencing that the communication information 153 is allowed. At operation 1134, the server 102 is configured to generate the communication information 153 based on the peripheral information 151.

The process 1100 may end at operation 1136, where the server 102 may be configured to transmit the communication information 153 to the network device 108.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory operable to store:
a machine learning algorithm configured to evaluate data in accordance with one or more machine learning models; and
at least one processor communicatively coupled to the memory and configured to:
receive first peripheral information from a network device, the first peripheral information comprising a first format;
generate a first tag for a first portion of the first peripheral information, wherein:
the first tag comprises first guidance to generate first communication information that correlates to the first peripheral information; and
the first communication information comprises a second format;
determine a first correlation between the first peripheral information and the first tag, the first correlation referencing a first amount of information preserved in the first communication information that matches the first peripheral information after the first communication information is generated based on the first peripheral information;
determine whether the first amount of information preserved is outside a first accuracy tolerance;
in response to determining that the first amount of information preserved is outside the first accuracy tolerance, execute the machine learning algorithm to:
determine at least one difference between the first peripheral information and the first communication information;
evaluate the at least one difference against historical data associated with the network device, the historical data comprising patterns associated with one or more previous communication information generated from previous peripheral information received from the network device;
determine a first plurality of tagging commands based on a first evaluation of the at least one difference against the historical data, the first plurality of tagging commands comprising a first plurality of possible modifications to the first tag; and
modify the first tag to incorporate the first plurality of possible modifications;
generate a first portion of the first communication information based on the first portion of the first peripheral information in accordance with a modified version of the first tag; and
transmit the first portion of the first communication information to the network device.

2. The system of claim 1, wherein the at least one processor is further configured to:
receive second peripheral information from the network device, the second peripheral information comprising a third format;
generate a second tag for a second portion of the second peripheral information, wherein:
the second tag comprises second guidance to generate second communication information that correlates to the second peripheral information; and
the second communication information comprises a fourth format;
determine a second correlation between the second peripheral information and the second tag, the second correlation referencing a second amount of information preserved in the second communication information that matches the second peripheral information after the second communication information is generated based on the second peripheral information; determine whether the second amount of information preserved is outside a second accuracy tolerance;
in response to determining that the second amount of information preserved is outside the second accuracy tolerance, execute the machine learning algorithm to:
determine one or more differences between the second peripheral information and the second communication information;
evaluate the one or more differences against the historical data associated with the network device;
determine a second plurality of tagging commands based on a second evaluation of the one or more differences against the historical data, the second plurality of tagging commands comprising a second plurality of possible modifications to the second tag; and modify the second tag to incorporate the second plurality of possible modifications;
determine a third correlation between the second peripheral information and a modified version of the second tag, the third correlation referencing a third amount of information preserved in the second communication information that matches the second peripheral information after the second communication information is generated based on the second peripheral information;
determine whether the third amount of information preserved is outside the second accuracy tolerance;
in response to determining that the third amount of information preserved is outside the second accuracy tolerance, further execute the machine learning algorithm to:
 determine one or more additional differences between the second peripheral information and the second communication information;
 evaluate the one or more additional differences against the historical data associated with the network device;
 determine a third plurality of tagging commands based on a third evaluation of the one or more additional differences against the historical data, the third plurality of tagging commands comprising a third plurality of possible modifications to the second tag; and
 modify the second tag to incorporate the third plurality of possible modifications;
generate a second portion of the second communication information based on the second portion of the second peripheral information in accordance with a modified version of the second tag; and
transmit the second portion of the second communication information to the network device.

3. The system of claim 1, wherein the at least one processor is further configured to:
 receive second peripheral information from the network device, the second peripheral information comprising a third format;
 generate a second tag for a second portion of the second peripheral information, wherein:
  the second tag comprises second guidance to generate second communication information that correlates to the second peripheral information; and
  the second communication information comprises a fourth format;
 determine a second correlation between the second peripheral information and the second tag, the second correlation referencing a second amount of information preserved in the second communication information that matches the second peripheral information after the second communication information is generated based on the second peripheral information;
 determine whether the second amount of information preserved is outside a second accuracy tolerance;
 in response to determining that the second amount of information preserved is outside the second accuracy tolerance, execute the machine learning algorithm to:
  determine one or more differences between the second peripheral information and the second communication information;
  evaluate the one or more differences against the historical data associated with the network device;
  determine a second plurality of tagging commands based on a second evaluation of the one or more differences against the historical data, the second plurality of tagging commands comprising a second plurality of possible modifications to the second tag; and
  modify the second tag to incorporate the second plurality of possible modifications;
 determine a third correlation between the second peripheral information and a modified version of the second tag, the third correlation referencing a third amount of information preserved in the second communication information that matches the second peripheral information after the second communication information is generated based on the second peripheral information;
 determine whether the third amount of information preserved is outside the second accuracy tolerance;
 in response to determining that the third amount of information preserved is not outside the second accuracy tolerance, generate a second portion of the second communication information based on the second portion of the second peripheral information in accordance with a modified version of the second tag; and
 transmit the second portion of the second communication information to the network device.

4. The system of claim 1, wherein the at least one processor is further configured to:
 train the one or more machine learning models using the first tag and the first plurality of tagging commands.

5. The system of claim 1, wherein:
 the first peripheral information is associated with a first peripheral of the network device; and
 the first peripheral information is collected after a user interacts with the first peripheral of the network device.

6. The system of claim 1, wherein:
 the first format of the first peripheral information comprises an image format; and
 the second format of the first communication information comprises a sound format.

7. The system of claim 1, wherein:
 the one or more machine learning models are one or more generative adversarial network models.

8. A method, comprising:
 receiving first peripheral information from a network device, the first peripheral information comprising a first format;
 generating a first tag for a first portion of the first peripheral information, wherein:
  the first tag comprises first guidance to generate first communication information that correlates to the first peripheral information; and
  the first communication information comprises a second format;
 determining a first correlation between the first peripheral information and the first tag, the first correlation referencing a first amount of information preserved in the first communication information that matches the first peripheral information after the first communication information is generated based on the first peripheral information;
 determining whether the first amount of information preserved is outside a first accuracy tolerance;
 in response to determining that the first amount of information preserved is outside the first accuracy tolerance, executing a machine learning algorithm to perform one or more operations comprising:
  determining at least one difference between the first peripheral information and the first communication information;

evaluating the at least one difference against historical data associated with the network device, the historical data comprising patterns associated with one or more previous communication information generated from previous peripheral information received from the network device;

determining a first plurality of tagging commands based on a first evaluation of the at least one difference against the historical data, the first plurality of tagging commands comprising a first plurality of possible modifications to the first tag; and modifying the first tag to incorporate the first plurality of possible modifications;

generating a first portion of the first communication information based on the first portion of the first peripheral information in accordance with a modified version of the first tag; and transmitting the first portion of the first communication information to the network device.

9. The method of claim 8, further comprising:

receiving second peripheral information from the network device, the second peripheral information comprising a third format;

generating a second tag for a second portion of the second peripheral information, wherein:
  the second tag comprises second guidance to generate second communication information that correlates to the second peripheral information; and
  the second communication information comprises a fourth format;

determining a second correlation between the second peripheral information and the second tag, the second correlation referencing a second amount of information preserved in the second communication information that matches the second peripheral information after the second communication information is generated based on the second peripheral information; determine whether the second amount of information preserved is outside a second accuracy tolerance;

in response to determining that the second amount of information preserved is outside the second accuracy tolerance, executing the machine learning algorithm to perform one or more first additional operations comprising:
  determining one or more differences between the second peripheral information and the second communication information;
  evaluating the one or more differences against the historical data associated with the network device;
  determining a second plurality of tagging commands based on a second evaluation of the one or more differences against the historical data, the second plurality of tagging commands comprising a second plurality of possible modifications to the second tag; and
  modifying the second tag to incorporate the second plurality of possible modifications;

determining a third correlation between the second peripheral information and a modified version of the second tag, the third correlation referencing a third amount of information preserved in the second communication information that matches the second peripheral information after the second communication information is generated based on the second peripheral information;

determining whether the third amount of information preserved is outside the second accuracy tolerance;

in response to determining that the third amount of information preserved is outside the second accuracy tolerance, further executing the machine learning algorithm to perform second additional operations comprising:
  determining one or more additional differences between the second peripheral information and the second communication information;
  evaluating the one or more additional differences against the historical data associated with the network device;
  determining a third plurality of tagging commands based on a third evaluation of the one or more additional differences against the historical data, the third plurality of tagging commands comprising a third plurality of possible modifications to the second tag; and
  modifying the second tag to incorporate the third plurality of possible modifications;

generating a second portion of the second communication information based on the second portion of the second peripheral information in accordance with a modified version of the second tag; and transmitting the second portion of the second communication information to the network device.

10. The method of claim 8, further comprising:

receiving second peripheral information from the network device, the second peripheral information comprising a third format;

generating a second tag for a second portion of the second peripheral information, wherein:
  the second tag comprises second guidance to generate second communication information that correlates to the second peripheral information; and
  the second communication information comprises a fourth format;

determining a second correlation between the second peripheral information and the second tag, the second correlation referencing a second amount of information preserved in the second communication information that matches the second peripheral information after the second communication information is generated based on the second peripheral information;

determining whether the second amount of information preserved is outside a second accuracy tolerance;

in response to determining that the second amount of information preserved is outside the second accuracy tolerance, executing the machine learning algorithm to perform one or more operations comprising:
  determining one or more differences between the second peripheral information and the second communication information;
  evaluating the one or more differences against the historical data associated with the network device;
  determining a second plurality of tagging commands based on a second evaluation of the one or more differences against the historical data, the second plurality of tagging commands comprising a second plurality of possible modifications to the second tag; and
  modifying the second tag to incorporate the second plurality of possible modifications;

determining a third correlation between the second peripheral information and a modified version of the second tag, the third correlation referencing a third amount of information preserved in the second communication information that matches the second peripheral information after the second communication information is generated based on the second peripheral information;

determining whether the third amount of information preserved is outside the second accuracy tolerance;

in response to determining that the third amount of information preserved is not outside the second accuracy tolerance, generating a second portion of the second communication information based on the second portion of the second peripheral information in accordance with a modified version of the second tag; and transmitting the second portion of the second communication information to the network device.

11. The method of claim 8, further comprising:
training one or more machine learning models using the first tag and the first plurality of tagging commands.

12. The method of claim 8, wherein:
the first peripheral information is associated with a first peripheral of the network device; and
the first peripheral information is collected after a user interacts with the first peripheral of the network device.

13. The method of claim 8, wherein:
the first format of the first peripheral information comprises an image format; and
the second format of the first communication information comprises a sound format.

14. The method of claim 8, wherein:
one or more machine learning models used to guide the machine learning algorithm are one or more generative adversarial network models.

15. A non-transitory computer-readable medium storing instructions that when executed by a processor cause the processor to:
receive first peripheral information from a network device, the first peripheral information comprising a first format;
generate a first tag for a first portion of the first peripheral information, wherein:
the first tag comprises first guidance to generate first communication information that correlates to the first peripheral information; and
the first communication information comprises a second format;
determine a first correlation between the first peripheral information and the first tag, the first correlation referencing a first amount of information preserved in the first communication information that matches the first peripheral information after the first communication information is generated based on the first peripheral information;
determine whether the first amount of information preserved is outside a first accuracy tolerance;
in response to determining that the first amount of information preserved is outside the first accuracy tolerance, execute a machine learning algorithm to:
determine at least one difference between the first peripheral information and the first communication information;
evaluate the at least one difference against historical data associated with the network device, the historical data comprising patterns associated with one or more previous communication information generated from previous peripheral information received from the network device;
determine a first plurality of tagging commands based on a first evaluation of the at least one difference against the historical data, the first plurality of tagging commands comprising a first plurality of possible modifications to the first tag; and
modify the first tag to incorporate the first plurality of possible modifications;
generate a first portion of the first communication information based on the first portion of the first peripheral information in accordance with a modified version of the first tag; and
transmit the first portion of the first communication information to the network device.

16. The non-transitory computer-readable medium of claim 15, wherein, when executed by the processor, the instructions further cause the processor to:
receive second peripheral information from the network device, the second peripheral information comprising a third format;
generate a second tag for a second portion of the second peripheral information, wherein:
the second tag comprises second guidance to generate second communication information that correlates to the second peripheral information; and
the second communication information comprises a fourth format;
determine a second correlation between the second peripheral information and the second tag, the second correlation referencing a second amount of information preserved in the second communication information that matches the second peripheral information after the second communication information is generated based on the second peripheral information; determine whether the second amount of information preserved is outside a second accuracy tolerance;
in response to determining that the second amount of information preserved is outside the second accuracy tolerance, execute the machine learning algorithm to:
determine one or more differences between the second peripheral information and the second communication information;
evaluate the one or more differences against the historical data associated with the network device;
determine a second plurality of tagging commands based on a second evaluation of the one or more differences against the historical data, the second plurality of tagging commands comprising a second plurality of possible modifications to the second tag; and
modify the second tag to incorporate the second plurality of possible modifications;
determine a third correlation between the second peripheral information and a modified version of the second tag, the third correlation referencing a third amount of information preserved in the second communication information that matches the second peripheral information after the second communication information is generated based on the second peripheral information;
determine whether the third amount of information preserved is outside the second accuracy tolerance;
in response to determining that the third amount of information preserved is outside the second accuracy tolerance, further executing the machine learning algorithm to:
determine one or more additional differences between the second peripheral information and the second communication information;

evaluate the one or more additional differences against the historical data associated with the network device;
determine a third plurality of tagging commands based on a third evaluation of the one or more additional differences against the historical data, the third plurality of tagging commands comprising a third plurality of possible modifications to the second tag; and
modify the second tag to incorporate the third plurality of possible modifications;
generate a second portion of the second communication information based on the second portion of the second peripheral information in accordance with a modified version of the second tag; and
transmit the second portion of the second communication information to the network device.

17. The non-transitory computer-readable medium of claim 15, wherein, when executed by the processor, the instructions further cause the processor to:
receive second peripheral information from the network device, the second peripheral information comprising a third format;
generate a second tag for a second portion of the second peripheral information, wherein:
the second tag comprises second guidance to generate second communication information that correlates to the second peripheral information; and
the second communication information comprises a fourth format;
determine a second correlation between the second peripheral information and the second tag, the second correlation referencing a second amount of information preserved in the second communication information that matches the second peripheral information after the second communication information is generated based on the second peripheral information;
determine whether the second amount of information preserved is outside a second accuracy tolerance;
in response to determining that the second amount of information preserved is outside the second accuracy tolerance, execute the machine learning algorithm to:
determine one or more differences between the second peripheral information and the second communication information;
evaluate the one or more differences against the historical data associated with the network device;
determine a second plurality of tagging commands based on a second evaluation of the one or more differences against the historical data, the second plurality of tagging commands comprising a second plurality of possible modifications to the second tag; and
modify the second tag to incorporate the second plurality of possible modifications;
determine a third correlation between the second peripheral information and a modified version of the second tag, the third correlation referencing a third amount of information preserved in the second communication information that matches the second peripheral information after the second communication information is generated based on the second peripheral information;
determine whether the third amount of information preserved is outside the second accuracy tolerance;
in response to determining that the third amount of information preserved is not outside the second accuracy tolerance, generate a second portion of the second communication information based on the second portion of the second peripheral information in accordance with a modified version of the second tag; and
transmit the second portion of the second communication information to the network device.

18. The non-transitory computer-readable medium of claim 15, wherein, when executed by the processor, the instructions further cause the processor to:
train one or more machine learning models using the first tag and the first plurality of tagging commands.

19. The non-transitory computer-readable medium of claim 15, wherein:
the first peripheral information is associated with a first peripheral of the network device; and
the first peripheral information is collected after a user interacts with the first peripheral of the network device.

20. The non-transitory computer-readable medium of claim 15, wherein:
the first format of the first peripheral information comprises an image format; and
the second format of the first communication information comprises a sound format.

* * * * *